United States Patent
Kadowaki

(10) Patent No.: US 10,066,681 B2
(45) Date of Patent: Sep. 4, 2018

(54) DRIVE TRANSMISSION MECHANISM, SHEET DISCHARGING APPARATUS, AND IMAGE FORMING APPARATUS

(71) Applicant: Sharp Kabushiki Kaisha, Sakai, Osaka (JP)

(72) Inventor: Hideaki Kadowaki, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/488,587

(22) Filed: Apr. 17, 2017

(65) Prior Publication Data

US 2017/0298999 A1 Oct. 19, 2017

(30) Foreign Application Priority Data

Apr. 18, 2016 (JP) .................................. 2016-083085

(51) Int. Cl.
*F16D 41/066* (2006.01)
*B65H 29/20* (2006.01)

(52) U.S. Cl.
CPC ........... *F16D 41/066* (2013.01); *B65H 29/20* (2013.01); *B65H 2403/72* (2013.01)

(58) Field of Classification Search
CPC .... B65H 2404/1421; B65H 2404/1424; B65H 2404/1521; B65H 2404/1523; B65H 2404/1544; B65H 2404/161; B65H 2403/72

See application file for complete search history.

(56) References Cited

U.S. PATENT DOCUMENTS 7,845,634 B2 * 12/2010 Asakawa ............... B65H 29/22
271/200
2004/0256787 A1 * 12/2004 Wada ................... B65H 3/0669
271/109

FOREIGN PATENT DOCUMENTS

JP 08-091677 A 4/1996
JP 2002-308494 A 10/2002

* cited by examiner

*Primary Examiner* — Michael C McCullough
(74) *Attorney, Agent, or Firm* — Keating & Bennett, LLP

(57) ABSTRACT

A drive transmission mechanism which transmits a rotational driving force to a roller to be shifted in directions of a rotational axis thereof is equipped with a rotary drive transmission member which is driven to rotate in a predetermined rotational direction, a holder which holds the roller in such a manner that the roller can slide freely in the rotational axis directions while rotating about the rotational axis, and a one-way clutch interposed between the rotary drive transmission member and the holder. The one-way clutch is configured to transmit a rotational driving force from the rotary drive transmission member to the holder, and also to permit the holder to rotate in the predetermined rotational direction relative to the rotary drive transmission member.

11 Claims, 17 Drawing Sheets

DRIVE TRANSMISSION MECHANISM, SHEET DISCHARGING APPARATUS, AND IMAGE FORMING APPARATUS

CROSS-REFERENCE TO RELATED APPLICATIONS

The present application claims priority under 35 U.S.C. § 119(a) to Japanese Patent Application No. 2016-083085, filed Apr. 18, 2016. The contents of this application are incorporated herein by reference in its entirety.

BACKGROUND OF THE INVENTION

Field of the Invention

The present invention relates to a drive transmission mechanism which transmits a rotational driving force to a roller which is shifted in directions of a rotational axis thereof, a sheet discharging device, and an image forming apparatus such as a copying machine, a multifunction device, a printer or a facsimile.

Description of the Related Art

As the drive transmission mechanism, for example, in addition to a drive transmission mechanism for transmitting a rotational driving force to a roller, there is a drive transmission mechanism for transmitting a rotational driving force to a roller shifted in directions of its rotational axis.

For example, such a drive transmission mechanism may be provided in a sheet discharging device which is equipped with, as rollers, a pair of discharge rollers for discharging a sheet (e.g. a recording sheet). This drive transmission mechanism is configured to shift the discharge rollers in their rotational axis directions when a sheet is discharged by the discharge rollers (see, for example, JP H08-091677 A).

The image forming apparatus equipped with a sheet discharging device includes, for example, an image forming apparatus equipped with a post-processing apparatus which performs a predetermined post-processing to a sheet discharged by the sheet discharging device after an image formation process. For example, the post-processing apparatus may contain a finisher unit, which is specifically at least one of a punch unit for forming a hole in a printed sheet, a stapler unit for binding printed sheets, and a creaser unit for creasing a printed sheet.

In the drive transmission mechanism, the roller which is driven to rotate in a predetermined rotational direction is sometimes forced to rotate at a faster peripheral speed. This situation is described by way of an example wherein the drive transmission mechanism is provided in a sheet discharging device of an image forming apparatus equipped with a post-processing apparatus and wherein a sheet discharge speed increases during a sheet discharge process (specifically, the sheet discharge speed gets faster than a sheet transport speed at which the sheet was fed in).

Namely, depending on the type of post-processing, the post-processing speed in the post-processing apparatus may be faster than an image formation speed (a processing speed) at which an image formation process is carried out in an image forming apparatus main body. For such a post-processing apparatus, it is required to transport a sheet at a faster speed than the image formation speed so as to gain time, and thereby to match the image formation speed and the post-processing speed precisely or as precisely as possible and keep the image formation speed and the post-processing speed coordinated with each other.

In this respect, JP 2002-308494 A discloses an image forming apparatus equipped with a paper discharge roller (a discharge roller) which is fixed in rotational axis directions thereof while discharging a piece of paper (a sheet), and paper transport rollers provided upstream of the paper discharge roller. In this image forming apparatus, the peripheral speed of the discharge roller for discharging a piece of paper is faster than the peripheral speed of the paper transport rollers, and the paper transport rollers and the power transmission mechanism are connected by a one-way clutch (see paragraphs [0041] and [0046] in JP 2002-308494 A).

Nevertheless, JP 2002-308494 A, directed to an image forming apparatus in which the discharge roller is fixed in the rotational axis directions while discharging a sheet, merely discloses a configuration for connecting the paper transport roller and the power transmission mechanism by the one-way clutch. This document does not teach anything about an arrangement for shifting the discharge roller in the rotational axis directions. Further, regarding the drive transmission mechanism which transmits a rotational driving force to a roller to be shifted in the rotational axis directions, JP 2002-308494 A does not give any consideration to an embodiment in which the roller driven to rotate in a predetermined rotational direction is forced to rotate at a faster peripheral speed (for example, in an arrangement which causes the discharge roller to shift in the rotational axis directions, an embodiment for discharging a sheet by increasing the sheet discharge speed during the sheet discharge process).

It may be conceivable to modify the apparatus disclosed in JP H08-091677 A by providing a one-way clutch between a roller axis of the shiftable discharge roller and a roller-side gear. In this case, however, the one-way clutch receives a load in rotational axis directions (thrust directions) of the discharge roller, which will shorten the service life of the one-way clutch. It may be also conceivable to provide a one-way clutch between a driving axis which receives a rotational driving force from a driving unit such as a drive motor and a drive-side gear which transmits the rotational driving force from the driving axis to the discharge roller. In this case, however, since the face width of the drive-side gear (the length in rotational axis directions) is longer by the shift distance of the discharge roller (see FIG. 6 in JP H08-091677 A), it is necessary to provide a one-way clutch having a greater length in the rotational axis directions or to provide a plurality of one-way clutches each having a short length in the rotational axis directions, in either case a cost increase and complication of the structure are inevitable. It may be further conceivable to rotationally drive the shiftable discharge roller, by means of a gear train including a one-way clutch. This arrangement will increase the number of gears and to increase the size of the apparatus accordingly.

In view of the above, the present invention aims to provide a drive transmission mechanism, a sheet discharging apparatus and an image forming apparatus, each of which transmits a rotational driving force to a roller which is shifted in directions of a rotational axis thereof, which can reduce a load to be imposed on the one-way clutch in the rotational axis directions, which can force the roller driven to rotate in a predetermined rotational direction to rotate at a faster peripheral speed, and which is still obtainable in a simple and compact structure at a low cost.

SUMMARY OF THE INVENTION

In order to solve the above problems, the present invention provides a drive transmission mechanism, a sheet discharging device, and an image forming apparatus as below.

(1) Drive Transmission Mechanism

A drive transmission mechanism according to the present invention transmits a rotational driving force to a roller to be shifted in directions of a rotational axis thereof. This drive transmission mechanism includes: a rotary drive transmission member which is driven to rotate in a predetermined rotational direction; a holder which holds the roller in such a manner that the roller can slide freely in the rotational axis directions while rotating about the rotational axis; and a one-way clutch interposed between the rotary drive transmission member and the holder. The one-way clutch is configured to transmit a rotational driving force from the rotary drive transmission member to the holder, and to permit the holder to rotate in the predetermined rotational direction relative to the rotary drive transmission member.

(2) Sheet Discharging Device

A sheet discharging device according to the present invention includes the above-mentioned drive transmission mechanism according to the present invention. In this sheet discharging device, the roller is a discharge roller for discharging a sheet. When the sheet is discharged by the discharge roller, the discharge roller is shifted in rotational axis directions thereof.

(3) Image Forming Apparatus

An image forming apparatus according to the present invention includes the above-mentioned sheet discharging device according to the present invention.

In an illustrative embodiment of the present invention, the holder may have a holder main body, and an axial member provided in the holder main body. The one-way clutch may be interposed between the rotary drive transmission member and the axial member, and may be configured to transmit the rotational driving force from the rotary drive transmission member to the holder main body via the axial member.

In an illustrative embodiment of the present invention, the one-way clutch may include an outer ring to be attached to the rotary drive transmission member, and a rolling member which is provided in an inner peripheral surface of the outer ring and which is rotatable in one direction. The axial member may be composed of a rigid member. The axial member may be configured to be inserted along the inner peripheral surface of the outer ring, to allow an outer peripheral surface of the axial member to make contact with the rolling member, and to rotate with the rolling member.

In an illustrative embodiment of the present invention, the axial member composed of a rigid member may be made of a metallic material.

In an illustrative embodiment of the present invention, the one-way clutch may be fixed at an outer end of the rotary drive transmission member in the rotational axis directions.

In an illustrative embodiment of the present invention, the rotary drive transmission member may be a gear, and the gear may have helical teeth.

The present invention can reduce a load to be imposed on the one-way clutch in the rotational axis directions, which can force the roller driven to rotate in a predetermined rotational direction to rotate at a faster peripheral speed, and which is still obtainable in a simple and compact structure at a low cost.

DESCRIPTION OF PREFERRED EMBODIMENTS

Hereinafter, embodiments of the present invention are described with reference to the drawings.

[Overall Configuration of an Image Forming Apparatus]

Figure 1:
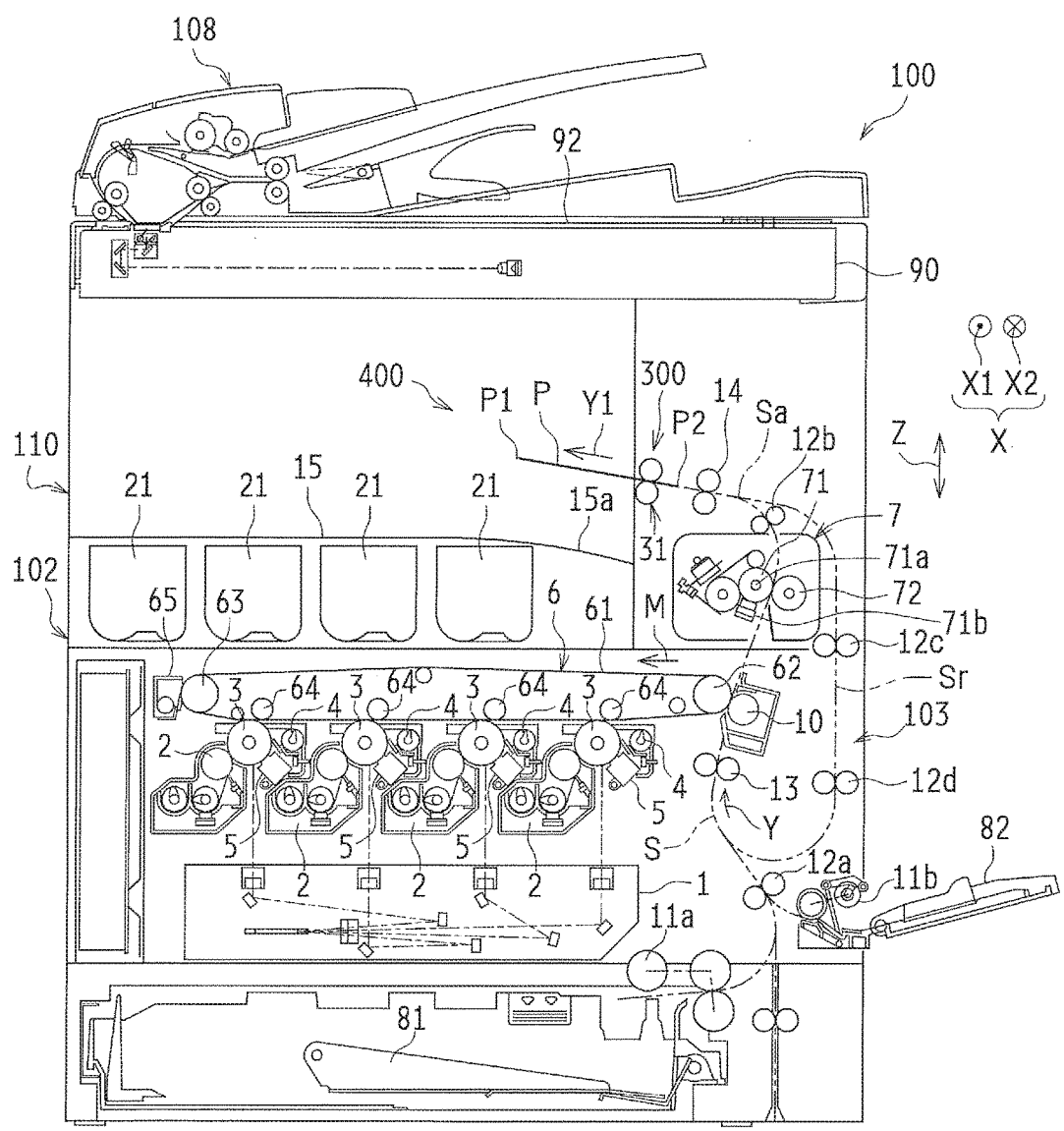
FIG. 1 is a front schematic cross section of an image forming apparatus according to present embodiments.

FIG. 1 is a front schematic cross section of an image forming apparatus 100 according to the present embodiments.

The image forming apparatus 100 shown in FIG. 1 is a color image forming apparatus which forms a multicolor or single color image on a sheet P such as a recording sheet (in this example, a recording sheet), based on externally transmitted image data. The image forming apparatus 100 is provided with a document reading device 108 and an image forming apparatus main body 110. The image forming apparatus main body 110 contains an image forming unit 102 and a sheet transport system 103.

The image forming unit 102 includes an exposure unit 1, a plurality of developing units 2-2, a plurality of photosensitive drums 3-3, a plurality of cleaning units 4-4, a plurality of charging units 5-5, an intermediate transfer belt unit 6, a plurality of toner cartridge units 21-21, and a fixing unit 7.

The sheet transport system 103 includes an automatic feed tray 81, a manual feed tray 82, a discharge tray 15, and a sheet discharging device 400.

An original stage 92, on which an original copy (not shown) is set, is made of transparent glass, and lies at the top of the image forming apparatus main body 110. An optical unit 90 for reading an original copy is provided under the original stage 92. A document reading device 108 is provided over the original stage 92, and automatically transports an original copy onto the original stage 92. The document reading device 108 is attached to the image forming apparatus main body 110 so as to freely rotate on a front side, and by opening the top of the original stage 92, an original copy can be placed by handing.

The document reading device 108 can read an automatically transported original copy or an original copy manually set on the original stage 92. An image of the original copy read by the document reading device 108 is sent as image data to the image forming apparatus main body 110. In the image forming apparatus main body 110, an image is formed according to the image data and is recorded on a sheet P.

Image data handled in the image forming apparatus 100 correspond to color images of multiple colors (in this example, black (K), cyan (C), magenta (M), and yellow (Y)). Hence, the number of developing units 2-2, photosensitive drums 3-3, cleaning units 4-4, charging units 5-5, and toner cartridge units 21-21 (in this example, four each corresponding to black, cyan, magenta, and yellow) correspond to the number of color images to be formed (in this example, four), and these components constitute a plurality of (in this example, four) imaging stations.

The charging units 5-5 are means for uniformly charging surfaces of the photosensitive drums 3-3 to a predetermined electrical potential. The charging units may be charger-type charging units as shown in FIG. 1, and may be also be contact-type charging units such as a roller charging unit and a brush charging unit.

The exposure unit 1 is a laser scanning unit equipped with a laser emitter and a reflection mirror. The exposure unit 1 is provided with a polygon mirror to which scan a laser beam, and an optical element (a lens, a mirror, or the like) for receiving laser light reflected by the polygon mirror and guiding the laser light to the photosensitive drums 3-3.

Based on the received image data, the exposure unit 1 exposes the charged photosensitive drums 3-3 and thereby forms latent images corresponding to the image data on surfaces of the photosensitive drums 3-3.

The toner cartridge units 21-21 contain toners and supply the toners to development tanks in the developing units 2-2. In the image forming apparatus main body 110, the toners are supplied from the toner cartridge units 21-21 to the development tanks in the developing units 2-2 in a controlled manner such that toner concentrations in developers in the development tanks are kept constant.

The developing units 2-2 develop latent images formed on the corresponding photosensitive drums 3-3 by means of toners in four colors (Y, M, C, K). The cleaning units 4-4 remove and collect residual toners which remain on the surfaces of the photosensitive drums 3-3 after the development process and the image transfer process.

The intermediate transfer belt unit 6 is disposed on top of the photosensitive drums 3-3, and is equipped with an intermediate transfer belt 61 which serves as an intermediate transfer unit, an intermediate transfer belt driving roller 62, an intermediate transfer belt follower roller 63, a plurality of intermediate transfer rollers 64-64, and an intermediate transfer belt cleaning unit 65.

The four intermediate transfer rollers 64-64 correspond to the colors Y, M, C, K, respectively. The intermediate transfer belt 61 is trained over the intermediate transfer belt driving roller 62, the intermediate transfer belt follower roller 63, and the intermediate transfer rollers 64-64. When the intermediate transfer belt driving roller 62 is driven to rotate, the intermediate transfer belt driving roller 62 causes the intermediate transfer belt 61 to move circularly in a traveling direction M, which then causes the intermediate transfer belt follower roller 63 and the intermediate transfer rollers 64-64 to rotate.

A transfer bias for transferring toner images formed on the photosensitive drums 3-3 onto the intermediate transfer belt 61 is applied to the intermediate transfer rollers 64-64.

The intermediate transfer belt 61 is disposed in contact with the photosensitive drums 3-3. Toner images of the four colors formed on the photosensitive drums 3-3 are sequentially transferred and overlapped on the intermediate transfer belt 61, so that a color toner image (a multicolor toner image) can be formed on the surface of the intermediate transfer belt 61.

The toner images are transferred from the photosensitive drums 3-3 to the intermediate transfer belt 61 by means of the intermediate transfer rollers 64-64 which are disposed in contact with a backside of the intermediate transfer belt 61. In order to transfer the toner images, a high-voltage transfer bias, which is a high voltage having a polarity (+) opposite to the charge polarity (−) of the toners, is applied to the intermediate transfer rollers 64-64.

As mentioned already, the toner images of the four colors visualized on the photosensitive drums 3-3 are overlapped on the intermediate transfer belt 61. By a circling movement of the intermediate transfer belt 61, the toner images overlapped on the intermediate transfer belt 61 are transferred on a sheet P by means of a transfer roller 10 which constitutes a secondary transfer mechanism disposed at a position where the sheet P makes contact with the intermediate transfer belt 61.

At this moment, a voltage for transferring the toners to the sheet P, which is a high voltage having a polarity (+) opposite to the charge polarity (−) of the toners, is applied to the transfer roller 10, with a transfer nip being formed between the transfer roller 10 and the intermediate transfer belt 61. The transfer roller 10 and the intermediate transfer belt driving roller 62 are pressed into contact with each other and form a transfer nip therebetween. In this process of transferring the toner image from the intermediate transfer belt 61 onto the sheet P by means of the transfer roller 10, residual toner which has not been transferred to the sheet P but which remains on the intermediate transfer belt 61 is removed and collected by the intermediate transfer belt cleaning unit 65.

The automatic feed tray 81 stores in advance at least one sheet P on which an image is to be formed (printed), and is provided under the exposure unit 1 in the image forming apparatus main body 110. The manual feed tray 82 holds at least one sheet P on which an image is to be formed (printed).

The discharge tray 15 is provided above the image forming unit 102 in the image forming apparatus main body 110. On the discharge tray 15, one or more sheets on each of which an image has been formed (printed) are stacked face down. In the discharge tray 15, a receiving surface 15a on which the one or more sheets are discharged is designed lower on an upstream side than on a downstream side in a discharging direction Y1 of the sheet P.

The image forming apparatus main body 110 further includes a sheet transport path S for transporting a sheet P from the automatic feed tray 81 or the manual feed tray 82, via the transfer roller 10 and the fixing unit 7, to the discharge tray 15. Pick-up rollers 11a, 11b, a plurality of (in this example, first to fourth) transport rollers 12a-12d, registration rollers 13, the transfer roller 10, a heating roller 71 and a pressure roller 72 in the fixing unit 7, pre-discharging rollers 14, and a discharge roller part 31 are provided near the sheet transport path S.

The first to fourth transport rollers 12a-12d are small-size rollers for promoting and assisting transport of a sheet P. The first and second transport rollers 12a, 12b are provided along the sheet transport path S, and the third and fourth transport rollers 12c, 12d are provided along a reverse transport path Sr which branches off from the sheet transport path S at a branching point Sa. The pick-up roller 11a is provided near a sheet supply side of the automatic feed tray 81, picks up a sheet P one by one from the automatic feed tray 81 and supplies the sheet P into the sheet transport path S. Similarly, the pick-up roller 11b is provided near a sheet supply side of the manual feed tray 82, picks up a sheet P one by one from the manual feed tray 82 and supplies the sheet P into the sheet transport path S.

The registration rollers 13 temporarily hold a sheet P which is being transported in the sheet transport path S. At a timing for aligning a leading edge of the toner images on the photosensitive drums 3-3 and a downstream edge (a leading edge P1) of the sheet P in a transport direction Y, the registration rollers 13 resume transporting the sheet P to the transfer nip between the transfer roller 10 and the intermediate transfer belt 61.

The pre-discharging rollers 14 are provided in the sheet transport path S, downstream of the branching point Sa in the transport direction Y of the sheet P and upstream of the discharge roller part 31 in the transport direction Y of the sheet P. The pre-discharging rollers 14 receive a sheet P conveyed from the second transport rollers 12b via the branching point Sa, and transport the sheet P to the discharge roller part 31.

The fixing unit 7 fixes an unfixed toner image on a sheet P, and has the heating roller 71 and the pressure roller 72 as fixing rollers. When the heating roller 71 is driven to rotate, the pressure roller 72 is caused to follow the rotation. While rotating, the heating roller 71 and the pressure roller 72 transport a sheet P therebetween in sandwiched manner. The heating roller 71 is heated by an internal heater 71a and kept at a predetermined fixing temperature based on a signal from a temperature detector 71b. The heating roller 71 heated by the heater 71a cooperates with the pressure roller 72, such that a multicolor toner image transferred on a sheet P is molten, mixed, and pressurized onto the sheet P by thermo-compression, and thereby thermally fixed on the sheet P.

When single-side printing to a sheet P is requested, the thus configured image forming apparatus 100 supplies a sheet P from either the automatic feed tray 81 or the manual feed tray 82, and transports the sheet P to the registration rollers 13 by means of the first transport rollers 12a provided along the sheet transport path S. At a timing for aligning the leading edge P1 of the sheet P and the leading edge of the toner image on the intermediate transfer belt 61, the image forming apparatus 100 transports the sheet P by means of the transfer roller 10, and thereby allows the toner image to be transferred onto the sheet P. Thereafter, the image forming apparatus 100 causes the sheet P to pass through the fixing unit 7, where an unfixed toner on the sheet P is thermally molten and fixed. Finally, the image forming apparatus 100 transports the sheet P through the second transport rollers 12b, the pre-discharging rollers 14, and the discharge roller part 31, and discharges the sheet P to the discharge tray 15.

In the next section, a sheet sorting part 300 is described with reference to FIGS. 2 to 7. The elements which are numbered in FIG. 1 but not mentioned in the above description will be mentioned later.

[Sheet Sorting Part]

Figure 2:
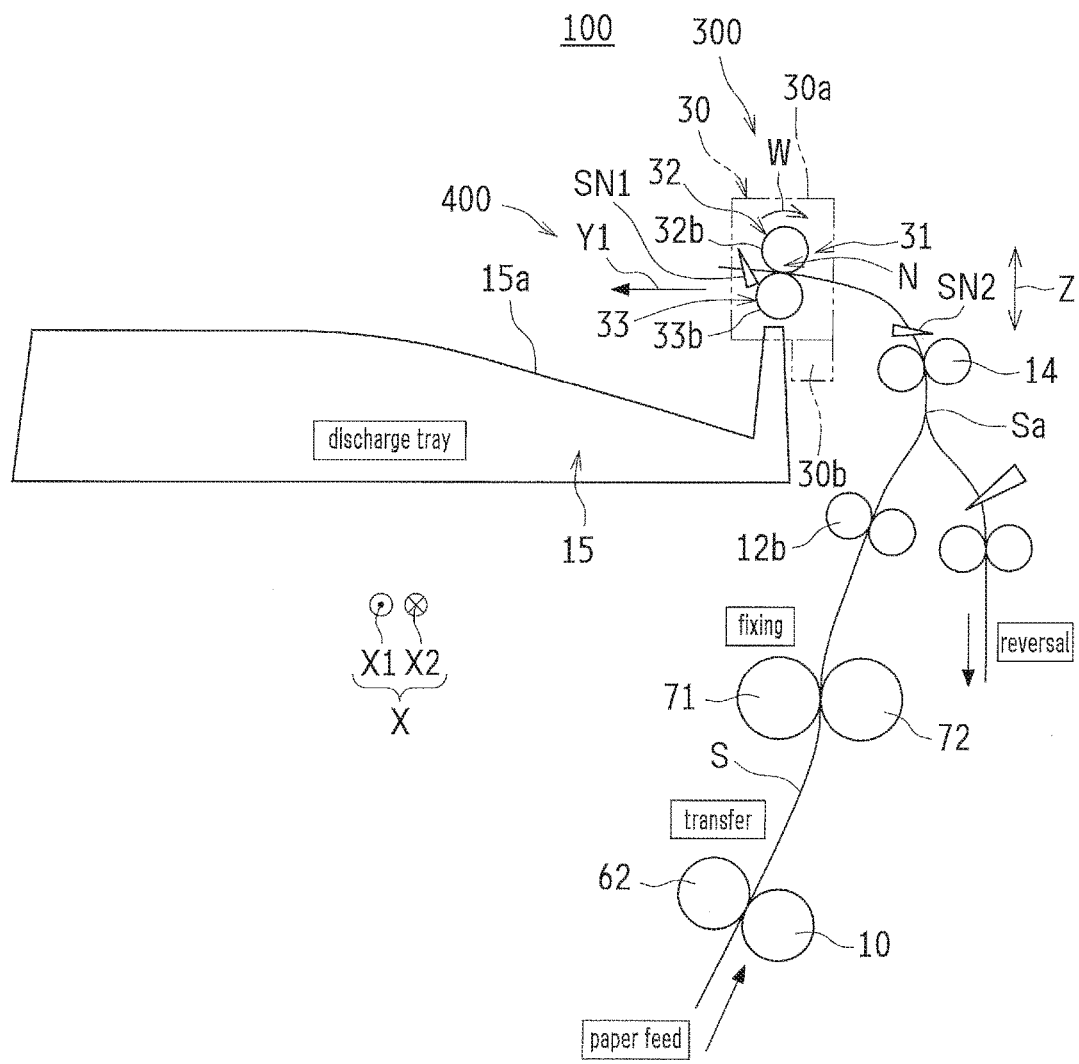
FIG. 2 is a schematic side view of a discharge roller part and a peripheral part thereof in a sheet discharging device shown in FIG. 1.
Figure 3:
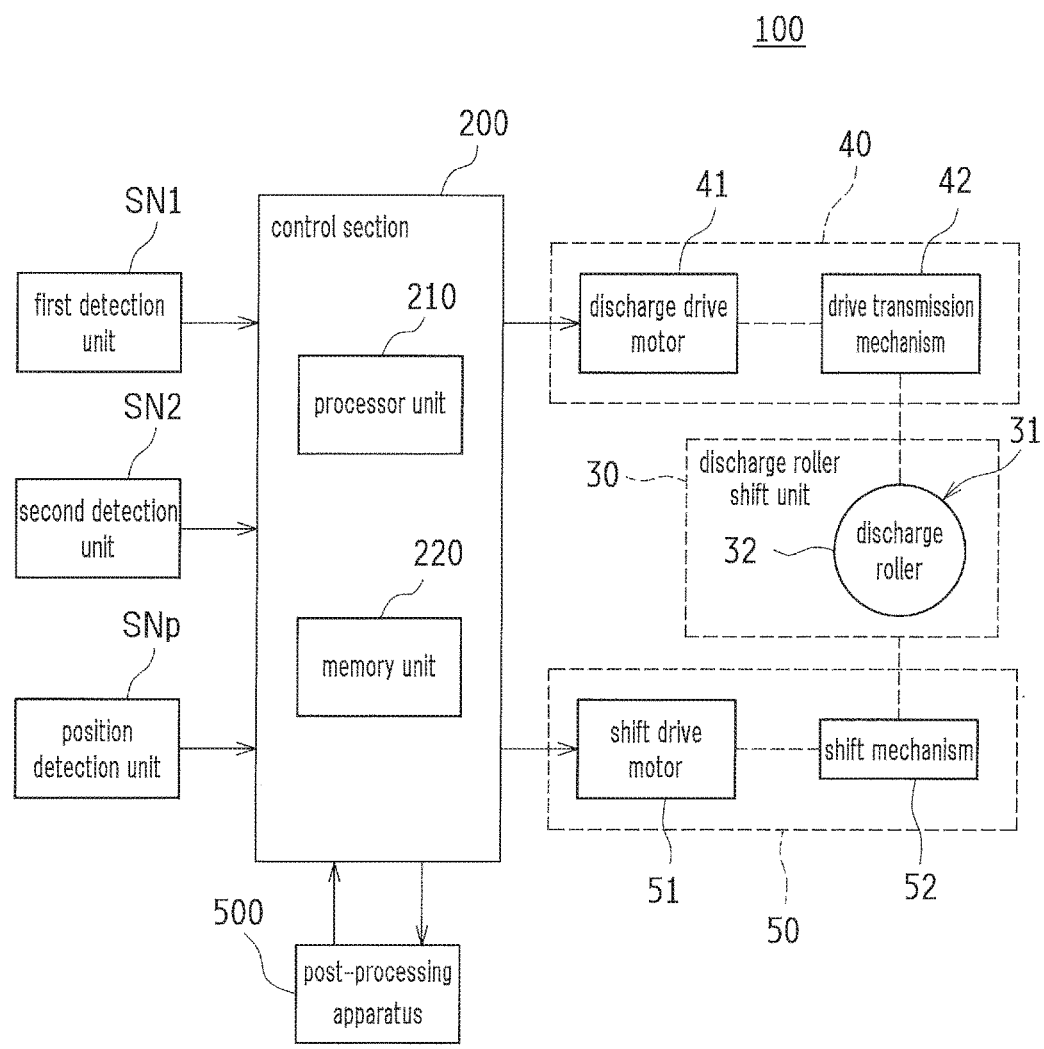
FIG. 3 is a system block diagram of a control system in the image forming apparatus shown in FIG. 1.
Figure 4:
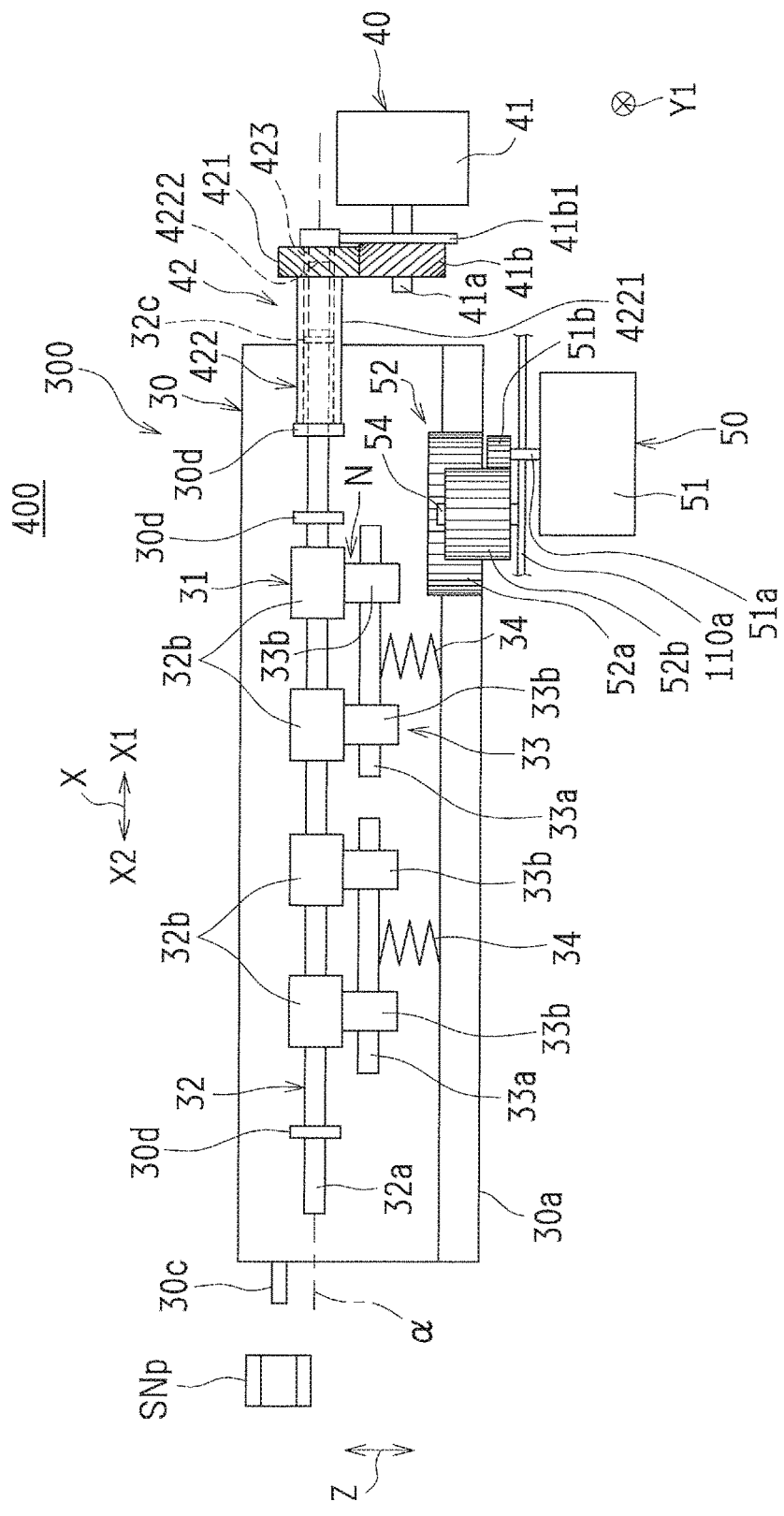
FIG. 4 is a schematic side view of a sheet sorting part in the sheet discharging device shown in FIG. 1, as viewed from upstream in a sheet discharge direction.
Figure 5:
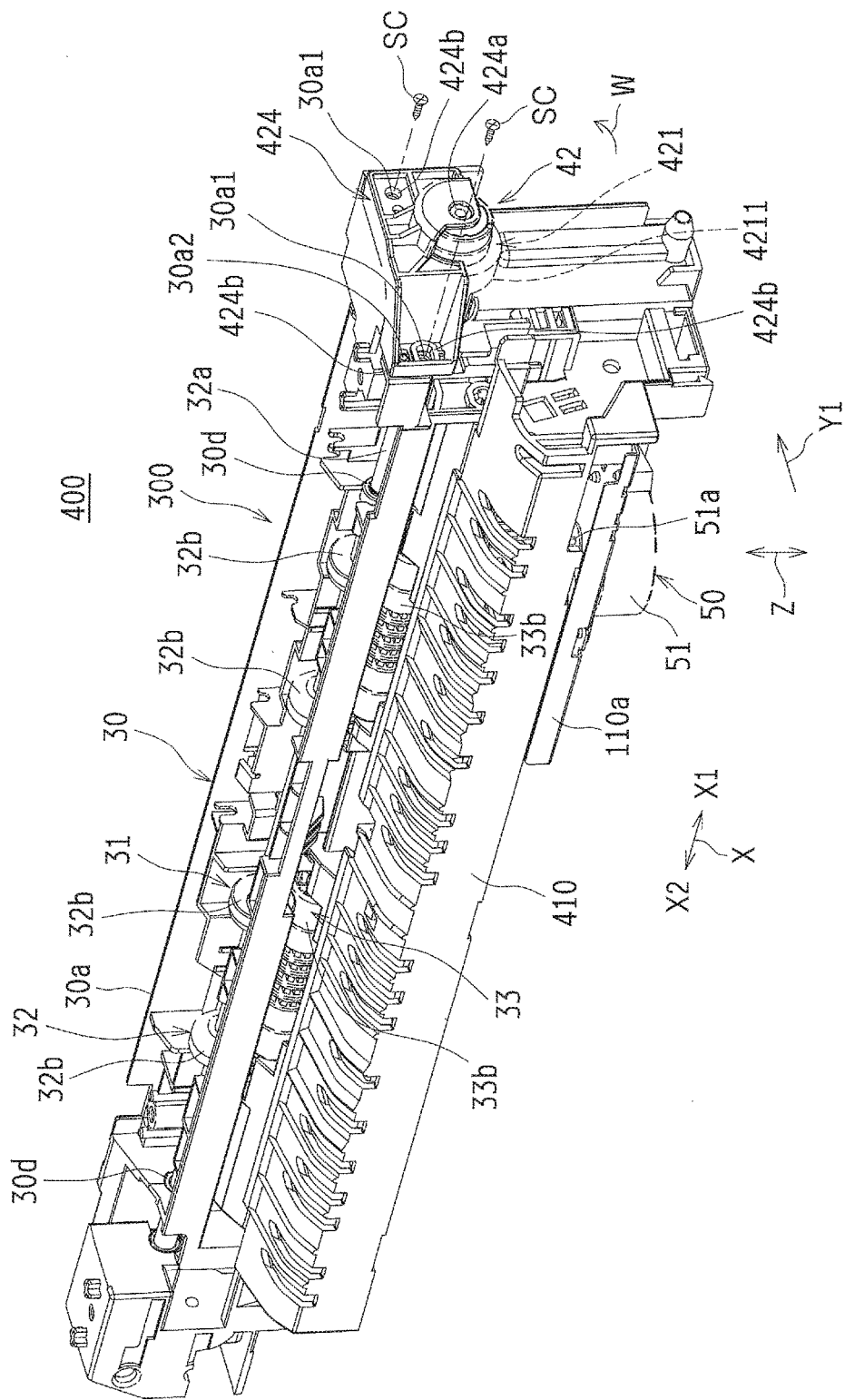
FIG. 5 is a schematic perspective view of the sheet discharging device shown in FIG. 1, as viewed obliquely from above and upstream in the sheet discharge direction.
Figure 6:
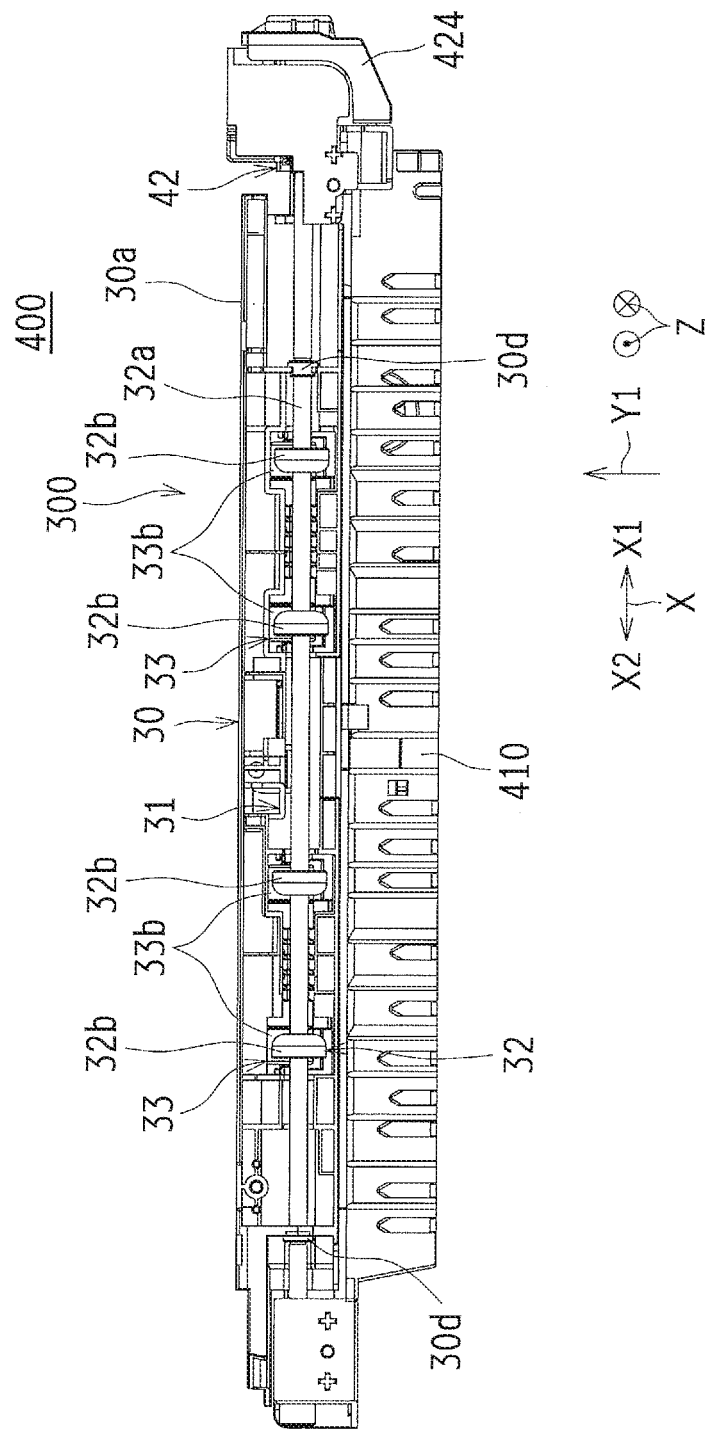
FIG. 6 is a schematic plan view of the sheet discharging device shown in FIG. 5.
Figure 7:
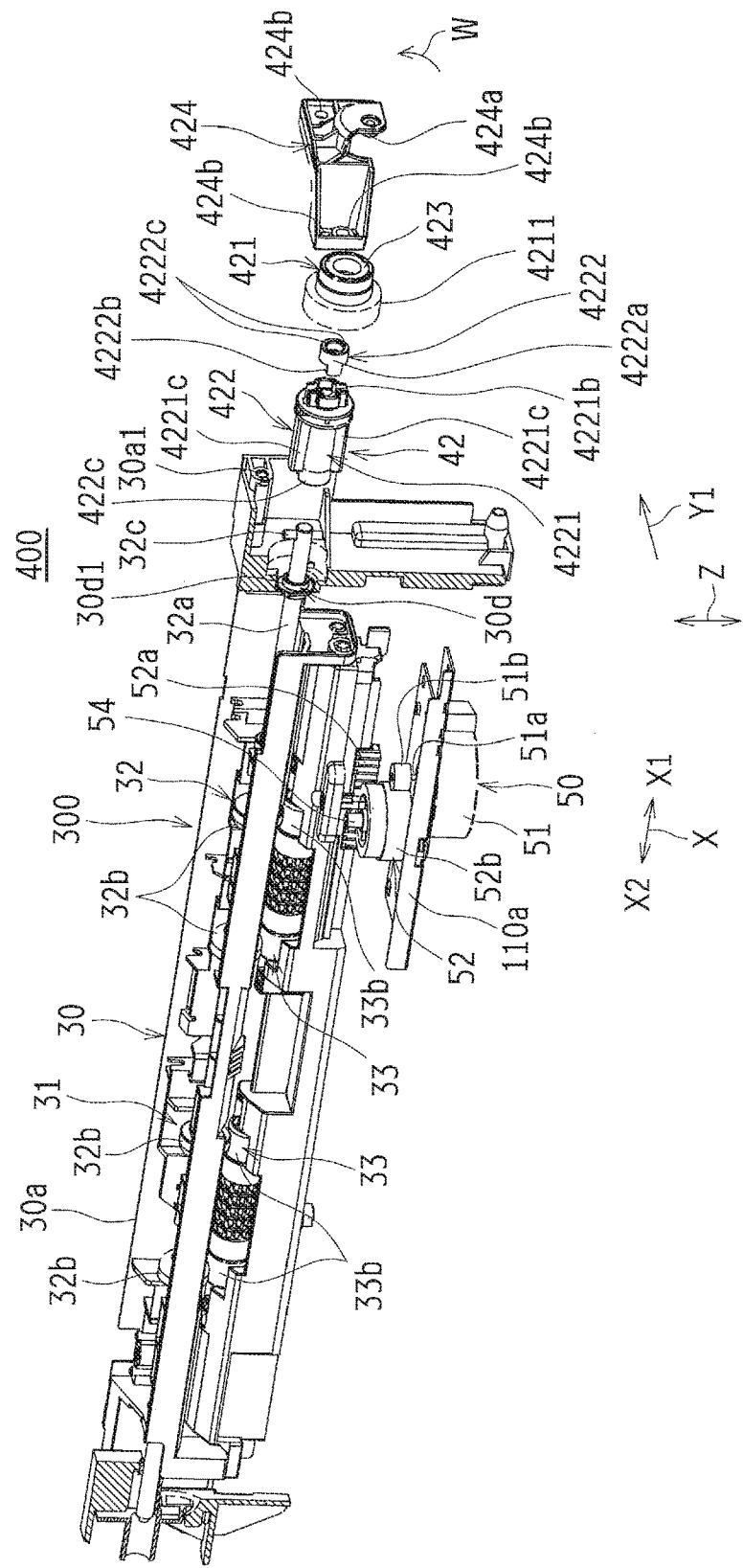
FIG. 7 is a schematic perspective view of the sheet discharging device shown in FIG. 5, partially shown in section, with a discharge guide member removed.

FIG. 2 is a schematic side view of a discharge roller part 31 and a peripheral part thereof in the sheet discharging device 400 shown in FIG. 1. FIG. 3 is a system block diagram of a control system in the image forming apparatus 100 shown in FIG. 1. FIG. 4 is a schematic side view of a sheet sorting part 300 in the sheet discharging device 400 shown in FIG. 1, as viewed from upstream in the discharge direction Y1 of the sheet P. FIG. 5 is a schematic perspective view of the sheet discharging device 400 shown in FIG. 1, as viewed obliquely from above and upstream in the discharge direction Y1 of the sheet P. FIG. 6 is a schematic plan view of the sheet discharging device 400 shown in FIG. 5. FIG. 7 is a schematic perspective view of the sheet discharging device 400 shown in FIG. 5, partially shown in section, with a discharge guide member 410 removed.

As shown in FIGS. 2 to 7, the sheet discharging device 400 in the present embodiments has a pair of discharge rollers 32, 33 for discharging a sheet P. When a sheet P is discharged by means of the pair of discharge rollers 32, 33, the sheet discharging device 400 is configured to be shifted the pair of discharge rollers 32, 33 in the rotational axis directions X of the pair of discharge rollers 32, 33.

The sheet discharging device 400 includes a sheet sorting part 300. The sheet sorting part 300 causes the pair of discharge rollers 32, 33 to shift in the rotational axis directions X (thrust directions), and thereby sorts the sheet P which is discharged by the pair of discharge rollers 32, 33 in the predetermined discharging direction Y1 (to the discharge tray 15 in this example). The sheet discharging device 400 may also include the discharge tray 15.

The sheet sorting part 300 includes a discharge roller shift unit 30 having the discharge roller part 31, a rotary drive device 40 (see FIGS. 3 and 4), and a shift drive device 50 (see FIGS. 3 to 5, and 7).

The discharge roller shift unit 30 is provided so as to freely reciprocate with respect to the image forming apparatus main body 110 in the rotational axis directions X of the discharge roller part 31. In this example, the discharge roller shift unit 30 is held in the image forming apparatus main body 110 by means of a slide member 30b (specifically, a slide rail) which freely reciprocate in the rotational axis directions X (see FIG. 2). The slide member 30b may have a conventionally known configuration, and its detailed description is omitted herein.

The discharge roller shift unit 30 has a main body frame 30a (an example of the main body of the sheet discharging device 400) equipped with a detection piece 30c (specifically, a detection piece) (see FIG. 4) to be detected by a position detection unit SNp (see FIGS. 3 and 4).

The discharge roller part 31 serves to discharge a sheet P to the discharge tray 15. Specifically, the discharge roller part 31 includes the pair of discharge rollers 32, 33 composed of a first discharge roller 32 as a driving roller (an example of a roller) and second discharge rollers 33 as follower rollers. As the pair of discharge rollers 32, 33 in this example, the first discharge roller 32 is a driving roller, and the second discharge rollers 33 are follower rollers. Alternatively, the first discharge roller 32 and the second discharge rollers 33 may both be driving rollers.

In detail, the first discharge roller 32 has a roller axis 32a (see FIGS. 4 to 7) and a plurality of (in this example, four) roller members 32b-32b which are coaxially fixed on the roller axis 32a. The second discharge rollers 33 have roller axes 33a (see FIG. 4) and a plurality of (in this example, four) roller members 33b-33b which are coaxially fixed on the roller axes 33a and opposed to the roller members 32b of the first discharge roller 32. The discharge roller part 31 further has biasing members 34 (in this example, helical springs) (see FIG. 4) for biasing the roller members 33b of the second discharge rollers 33 toward the roller members 32b of the first discharge roller 32.

The pair of discharge rollers 32, 33 and the biasing members 34 are provided in the main body frame 30a of the discharge roller shift unit 30. In at least one of the pair of discharge rollers 32, 33 (in this example, the first discharge roller 32), at least one end thereof (in this example, an end on a first side X1 in the rotational axis directions X) is connected to the rotary drive device 40.

Specifically, the first discharge roller 32 has a single roller axis 32a, the roller axis 32a is arranged so as to freely rotate about a rotational axis α (see FIG. 4) with respect to the main body frame 30a of the discharge roller shift unit 30.

The second discharge rollers 33 have a plurality of (in this example, two) roller axes 33a arranged side by side in the rotational axis directions X, and a plurality of (in this example, two) roller members 33b, 33b are fixedly mounted on each of the roller axes 33a. In the main body frame 30a of the discharge roller shift unit 30, the roller axes 33a, 33a of the second discharge roller 33 are arranged so as to freely rotate about a rotational axis thereof and freely reciprocate in vertical directions Z, such that the roller members 33b, 33b are opposed to the roller members 32b, 32b of the first discharge roller 32. The discharge roller part 31 is configured to transport a sheet P through nip parts N between the first discharge roller 32 and the second discharge rollers 33 (see FIGS. 2 and 4), with the sheet P being sandwiched therebetween and pressed by the second discharge rollers 33.

The number of biasing members 34 corresponds to the number of the roller axes 33a, 33a of the second discharge rollers 33 (in this example, two biasing members 34, 34 for two roller axes 33a, 33a). The biasing members 34, 34 bias the second discharge rollers 33 toward the first discharge roller 32. The biasing members 34, 34 are disposed between the roller axes 33a, 33a of the second discharge rollers 33 and the main body frame 30a of the discharge roller shift unit 30, on a far side of the first discharge roller 32. A force of pressure applied by the biasing members 34, 34 to the first discharge roller 32 via the second discharge rollers 33 is adjusted to enable proper transport of the sheet P.

The rotary drive device 40 rotationally drives the first discharge roller 32. The rotary drive device 40 includes a rotary drive unit (in this example, a discharge drive motor 41, which is specifically a stepping motor) (see FIGS. 3 and 4), and a drive transmission mechanism 42 for transmitting a rotational driving force from the discharge drive motor 41 to the first discharge roller 32 (see FIGS. 3 to 7).

The discharge drive motor 41 is provided in the image forming apparatus main body 110, with a rotation axis 41a thereof (see FIG. 4) extending in the rotational axis directions X. A drive gear 41b (see FIG. 4) is fixedly mounted on the rotation axis 41a of the discharge drive motor 41. The drive gear 41b is in mesh with a rotary drive transmission member 421 (see FIGS. 4, 5, and 7). The drive gear 41b is equipped with a disc-shaped limiter member 41b1 (see FIG. 4) which prevents a distance to the rotary drive transmission member 421 from being shorter than a predetermined distance. In this example, the drive gear 41b and the limiter member 41b1 are formed as a single piece.

The drive transmission mechanism 42 has a function of causing the first discharge roller 32 to rotate about the rotational axis α in response to a rotational driving force from the discharge drive motor 41, and a function of supporting the first discharge roller 32 while permitting the first discharge roller 32 to slide in the rotational axis directions X. The drive gear 41b and the drive transmission mechanism 42 may be arranged to mesh with each other, by a gear or a gear train composed of more than one gear interposed between the drive gear 41b and the drive transmission mechanism 42. Detailed description of the drive transmission mechanism 42 will be given later.

The shift drive device 50 drives the discharge roller part 31 (in this example, the discharge roller shift unit 30) in a shifting manner and causes the discharge roller part 31 to shift in the rotational axis directions X (shift directions). The shift drive device 50 includes a shift drive unit (in this example, a shift drive motor 51, which is a stepping motor in this example) (see FIGS. 3 to 5, and 7), and a shift mechanism 52 for shifting the discharge roller shift unit 30 (see FIGS. 3, 4, and 7).

The shift drive motor 51 is disposed in the main body frame 110a of the image forming apparatus main body 110, with a rotation axis 51a thereof (see FIGS. 4, 5, and 7) extending in directions orthogonal to the rotational axis directions X (in this example, extending in vertical directions Z) (see FIGS. 4, 5, and 7). A drive gear 51b (see FIGS. 4 and 7) is fixedly mounted on the rotation axis 51a of the shift drive motor 51.

The shift mechanism 52 is composed of a rack-and-pinion gear which converts rotary drive into linear drive, and includes a rack gear 52a extending in the rotational axis directions X (see FIGS. 4 and 7), and a pinion gear 52b (see FIGS. 4 and 7).

The rack gear 52a, oriented in the rotational axis directions X, is disposed on the discharge roller shift unit 30. The pinion gear 52b is held so as to freely rotate on a support axis 54 (see FIGS. 4 and 7) which is fixed on the main body frame 110a of the image forming apparatus main body 110 and which extends in the directions orthogonal to the rotational axis directions X (in this example, in the vertical directions Z). The pinion gear 52b meshes with both the drive gear 51b and the rack gear 52a. According to this configuration, rotation of the rotation axis 51a of the shift drive motor 51 in a first direction or a second direction can cause the discharge roller shift unit 30 to reciprocate between the first side X1 and a second side X2 in the rotational axis directions X.

[Sorting Control]

The image forming apparatus 100 further includes a control section 200 (see FIG. 3), a first detection unit SN1 (see FIGS. 2 and 3), a second detection unit SN2 (see FIGS.

2 and 3), and a position detection unit SNp (see FIGS. 3 and 4). The control section 200 may be provided in the sheet discharging device 400.

As shown in FIG. 3, the control section 200 includes a processor unit 210 such as a CPU, and a memory unit 220 containing a ROM (Read Only Memory), a RAM (Random Access Memory) and a rewritable non-volatile memory. The ROM can store a control program which is a procedure to be performed by the processor unit 210. The RAM can provide a work area.

As the timing control of the sheet sorting part 300 in the image forming apparatus 100, the control section 200 controls timing of the rotary drive device 40 and the shift drive device 50. Although the timing control may be performed by whichever of the image forming apparatus 100 or the sheet discharging device 400, the following description is directed to an example where the timing control is performed by the image forming apparatus 100.

The first detection unit SN1 detects whether a sheet P is passing between the pair of discharge rollers 32, 33. Specifically, the first detection unit SN1 is a light-transmissive detection switch equipped with an actuator, and is disposed in the downstream of the pair of discharge rollers 32, 33 in the discharging direction Y1. The first detection unit SN1 is electrically connected to an input system of the control section 200. According to this configuration, the first detection unit SN1 can output, to the control section 200, either a no-sheet passing signal (in this example, an OFF signal) which indicates that no sheet P is passing between the pair of discharge rollers 32, 33 or a sheet passing signal (in this example, an ON signal) which indicates that a sheet P is passing between the pair of discharge rollers 32, 33.

The second detection unit SN2 detects whether a sheet P is passing between the nearest rollers (in this example, the pre-discharging rollers 14, see FIG. 2) which are disposed upstream of and nearest to the pair of discharge rollers 32, 33 in the discharging direction Y1. Specifically, the second detection unit SN2 is a light-transmissive detection switch equipped with an actuator, and is disposed in the downstream of the nearest rollers (in this example, the pre-discharging rollers 14) in the discharging direction Y1. The second detection unit SN2 is electrically connected to the input system of the control section 200. According to this configuration, the second detection unit SN2 can output, to the control section 200, either a no-sheet passing signal (in this example, an OFF signal) which indicates that no sheet P is passing between the nearest rollers (in this example, the pre-discharging rollers 14) or a sheet passing signal (in this example, an ON signal) which indicates that a sheet P is passing between the nearest rollers (in this example, the pre-discharging rollers 14).

The position detection unit SNp detects whether the discharge roller shift unit 30 is present at a reference position (specifically, a center position in the rotational axis directions X, namely, a standard position where sorting is not performed). Specifically, the position detection unit SNp is a light-transmissive sensor which detects the detection piece 30c (see FIG. 4) provided on the main body frame 30a of the discharge roller shift unit 30. The position detection unit SNp is electrically connected to the input system of the control section 200. According to this configuration, the position detection unit SNp can output, to the control section 200, either a unit present signal (in this example, an OFF signal) which indicates that the discharge roller shift unit 30 is present at the reference position or a unit absent signal (in this example, an ON signal) which indicates that the discharge roller shift unit 30 is not present at the reference position.

To be more specific, the control section 200 sends, to the discharge drive motor 41, a rotation command signal which instructs rotation of the first discharge roller 32 in a predetermined rotational direction W (in this example, a direction of discharging a sheet P) (see FIGS. 2, 5, and 7), and thereby drives the discharge drive motor 41. Thus, the control section 200 can drive the first discharge roller 32 of the discharge roller shift unit 30 to rotate in the predetermined rotational direction W, via the drive transmission mechanism 42.

The control section 200 also sends, to the shift drive motor 51, a movement command signal which instructs rotational movement (in this example, 15-mm-movement) of the discharge roller shift unit 30 to the first side X1 in the rotational axis directions X (to the right in the example shown in FIG. 4) relative to the reference position, and another movement command signal which instructs rotational movement (in this example, 15-mm-movement) of the discharge roller shift unit 30 to the second side X2 in the rotational axis directions X (to the left in the example shown in FIG. 4) relative to the reference position, and the control section 200 pulse-drives the shift drive motor 51 accordingly. Thus, the control section 200 can drive the discharge roller shift unit 30 to shift to the first side X1 and the second side X2, via the shift mechanism 52.

As described above, in the image forming apparatus 100, the rotation command signal from the control section 200 drives the discharge drive motor 41, and a driving force generated by the discharge drive motor 41 is transmitted to the drive transmission mechanism 42. As a result, the first discharge roller 32 is driven to rotate in the predetermined rotational direction W. If a sheet P is discharged by the discharge roller part 31 without sorting, the discharge roller shift unit 30 is kept at the reference position. If a sheet P is discharged by the discharge roller part 31 with sorting, the discharge roller shift unit 30 is shifted to the first side X1 or the second side X2. This shift movement is effected, with the discharge roller shift unit 30 being kept at the reference position, by driving the shift drive motor 51 by the movement command signal and then transmitting a driving force generated by the shift drive motor 51 to the shift mechanism 52. Thus, in the sheet discharging device 400 equipped with the sheet sorting part 300, when a sheet P is discharged in the discharging direction Y1 by the pair of discharge rollers 32, 33, the sheet sorting part 300 can shift the discharge roller shift unit 30 to the first side X1 and/or the second side X2 in the rotational axis directions X (in this example, to the first side X1 and the second side X2 in the rotational axis directions X). In this regard, the control section 200 may allow a sheet P to be discharged in the discharging direction Y1 while the discharge roller shift unit 30 is being shifted to the first side X1 or the second side X2 by the sheet sorting part 300 or after the discharge roller shift unit 30 is shifted to the first side X1 or the second side X2.

It should be understood that the sheet sorting part 300 is not limited to the above-mentioned configuration and may adopt any conventionally known configurations.

[Drive Transmission Mechanism]

Next, the drive transmission mechanism 42 is described with reference to FIGS. 2 to 7 and FIGS. 8 to 17.

Figure 8:
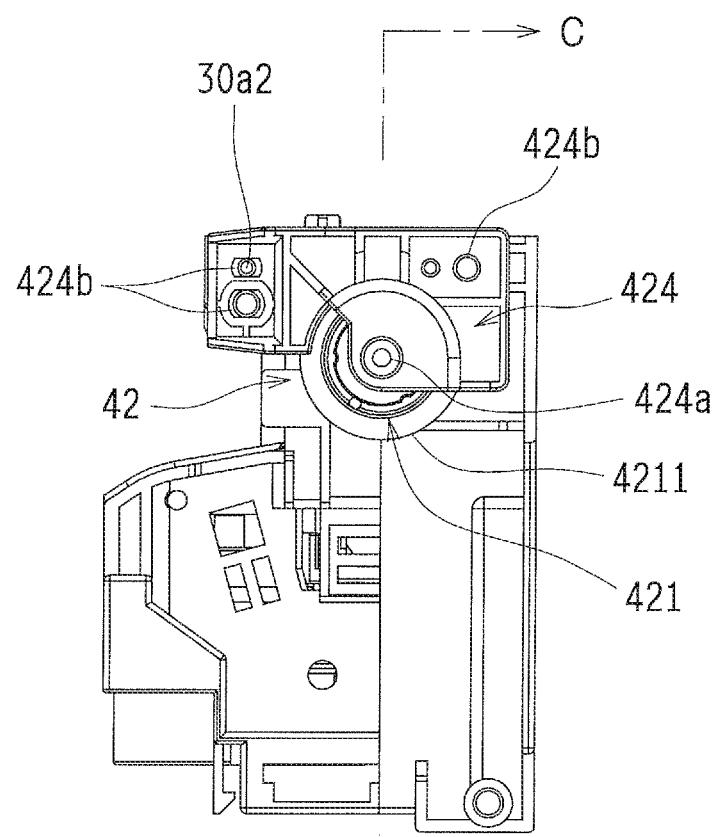
FIG. 8 is a schematic side view of the sheet discharging device shown in FIG. 5, as viewed from a first side in rotational axis directions.
Figure 8:
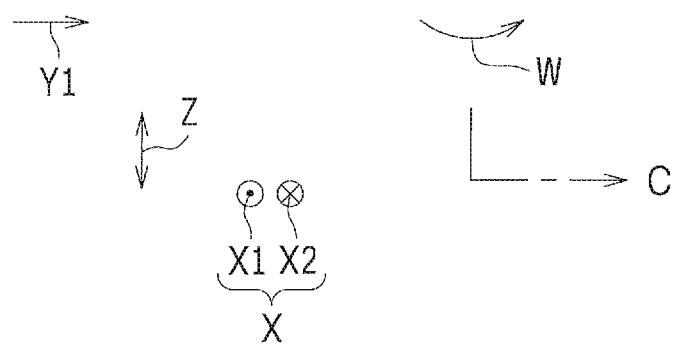
Figure 9:
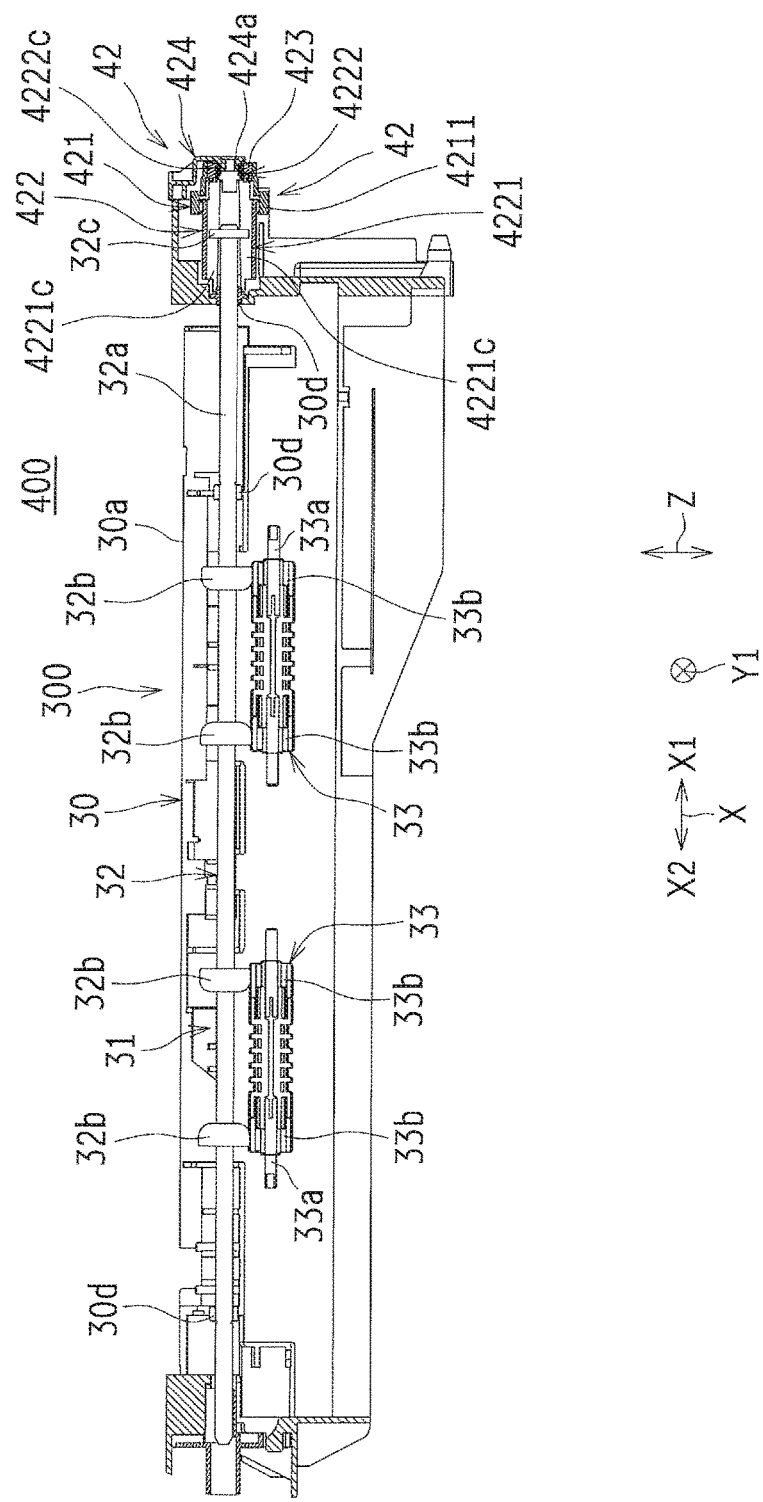
FIG. 9 is a schematic cross section of the sheet discharging device shown in FIG. 5, taken along a line C-C in FIG. 8.
Figure 10:
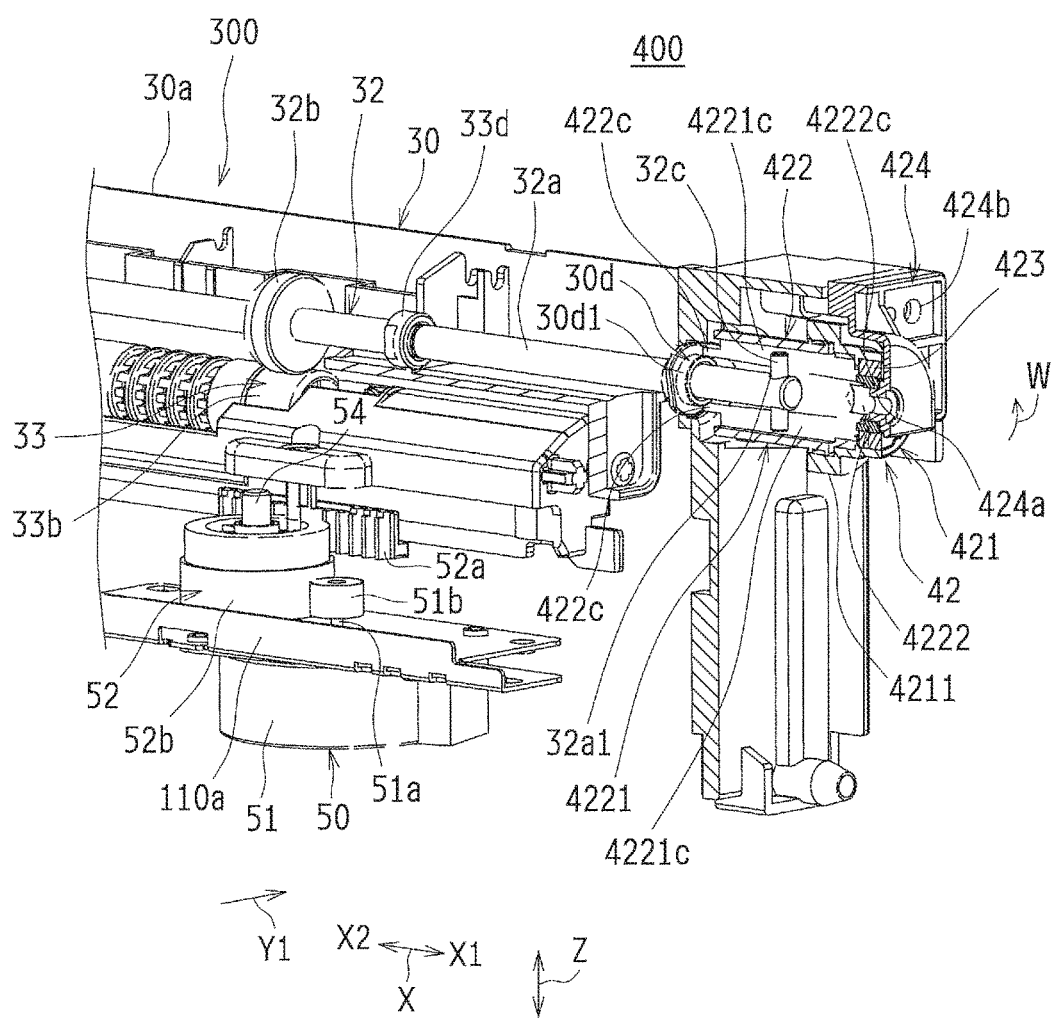
FIG. 10 is a partial schematic perspective view of the sheet discharging device shown in FIG. 7, on the first side in the rotational axis directions.
Figure 11:
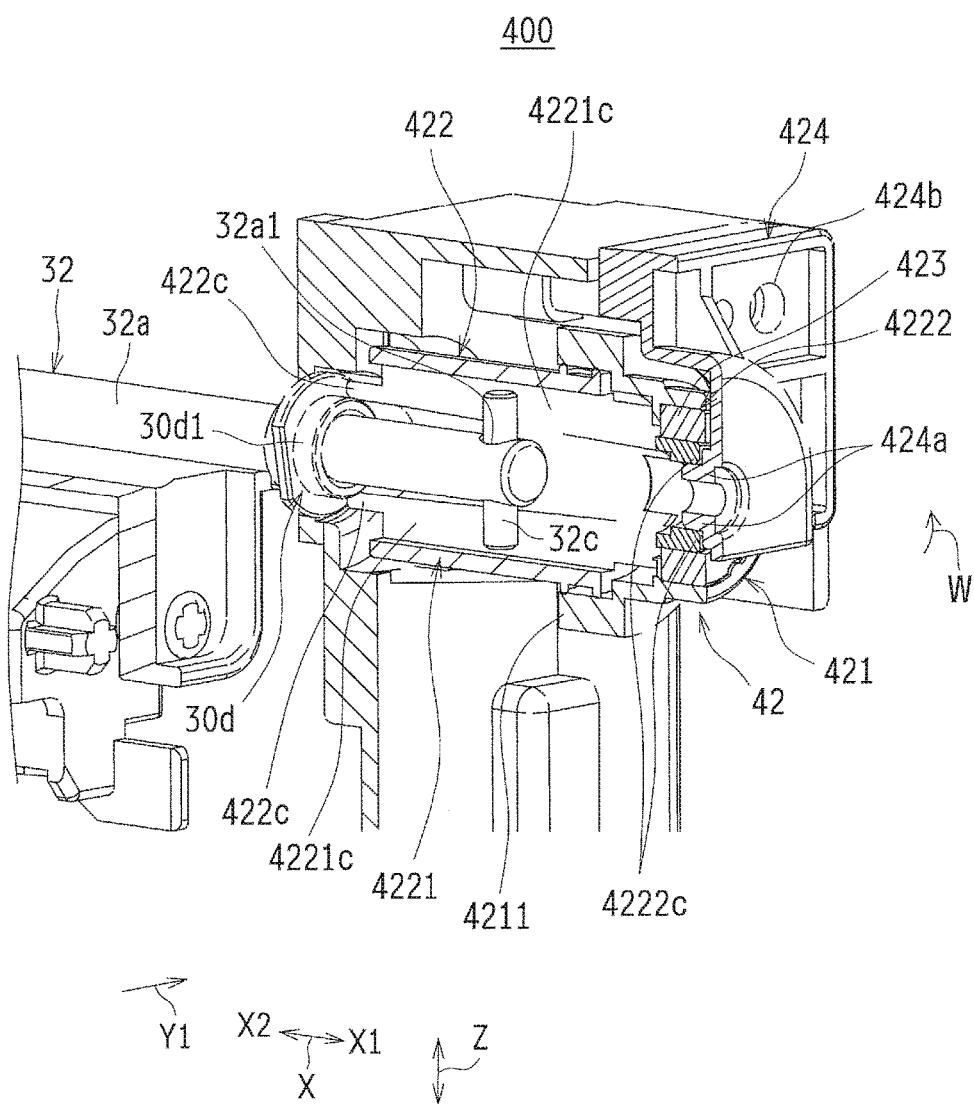
FIG. 11 is an enlarged partial schematic perspective view of a drive transmission mechanism in the sheet discharging device shown in FIG. 7.
Figure 12:
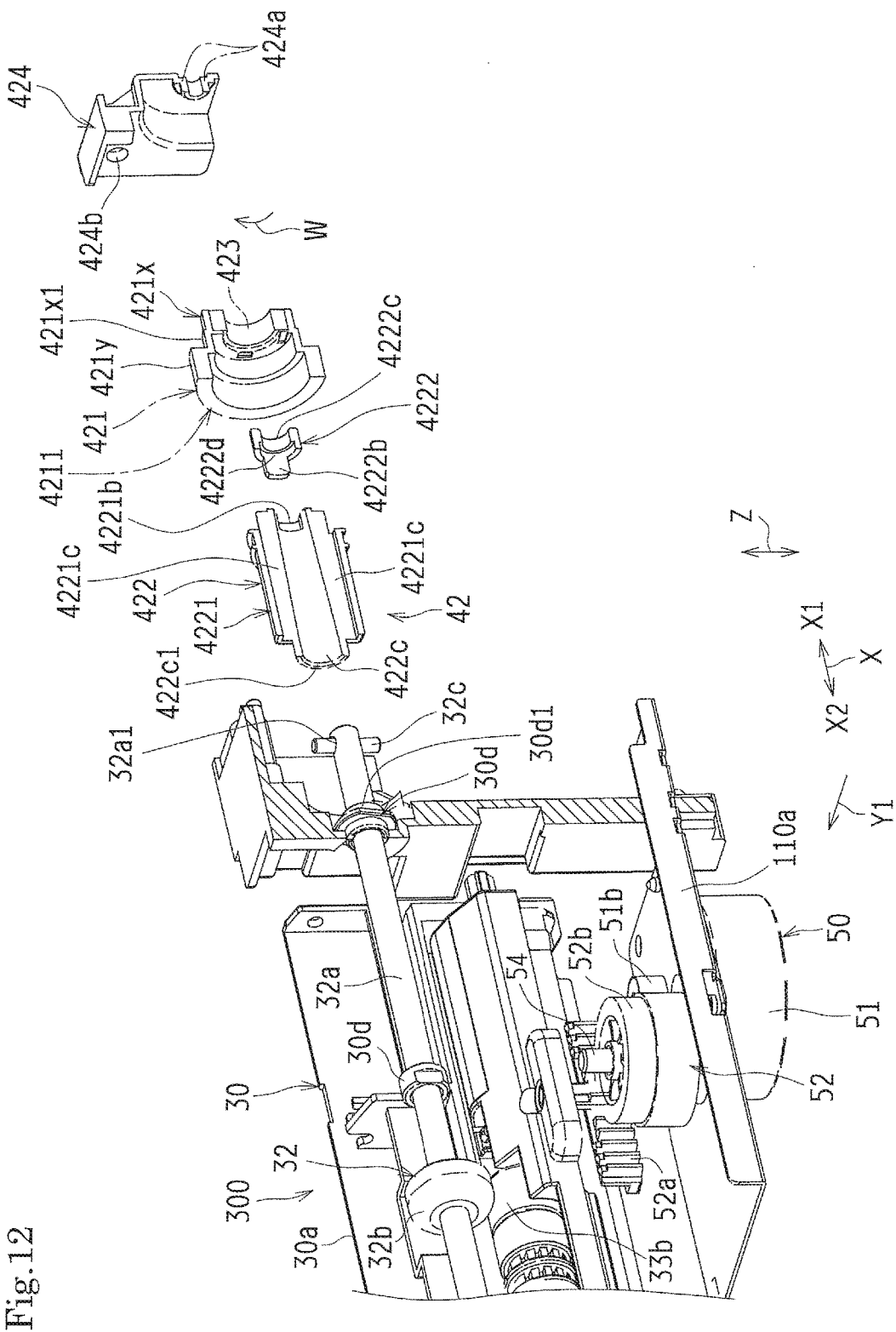
FIG. 12 is an exploded perspective view showing constituent members of the drive transmission mechanism shown in FIGS. 10 and 11.
Figure 13:
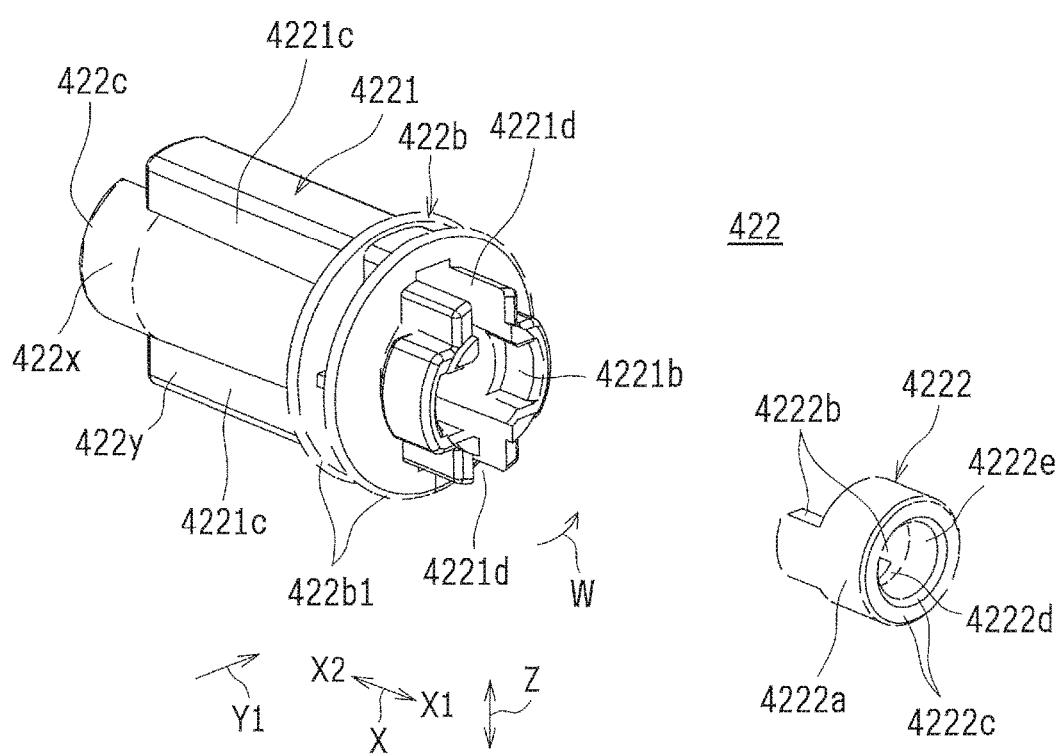
FIG. 13 is a perspective view showing a holder main body and an axial member of a holder in the drive transmission mechanism.
Figure 14:
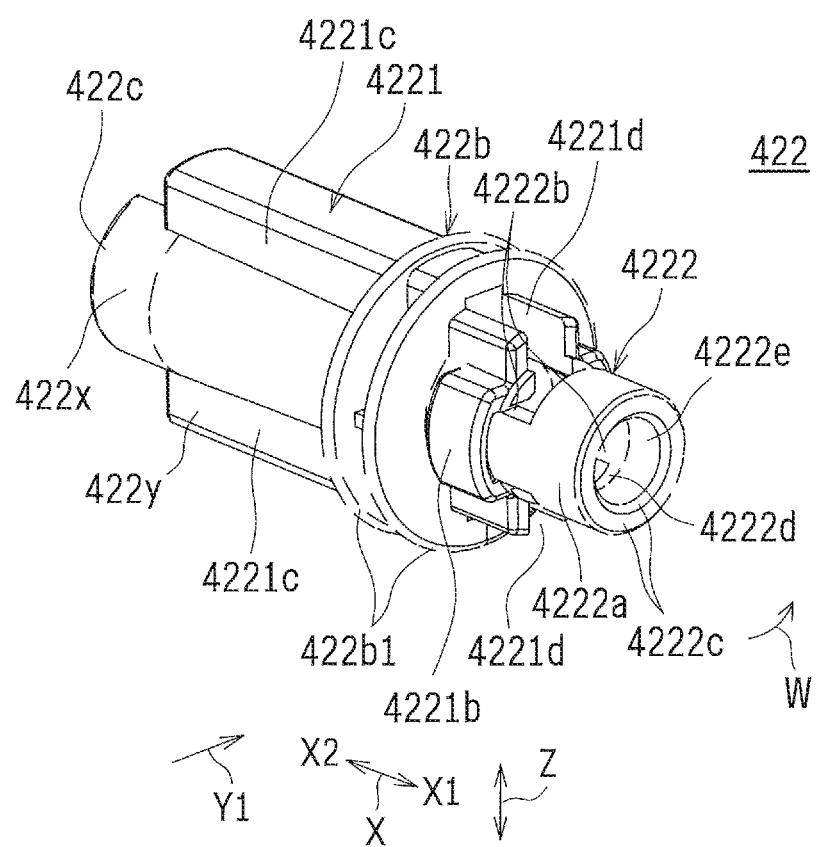
FIG. 14 is a perspective view in which the axial member is engaged with the holder main body.
Figure 15:
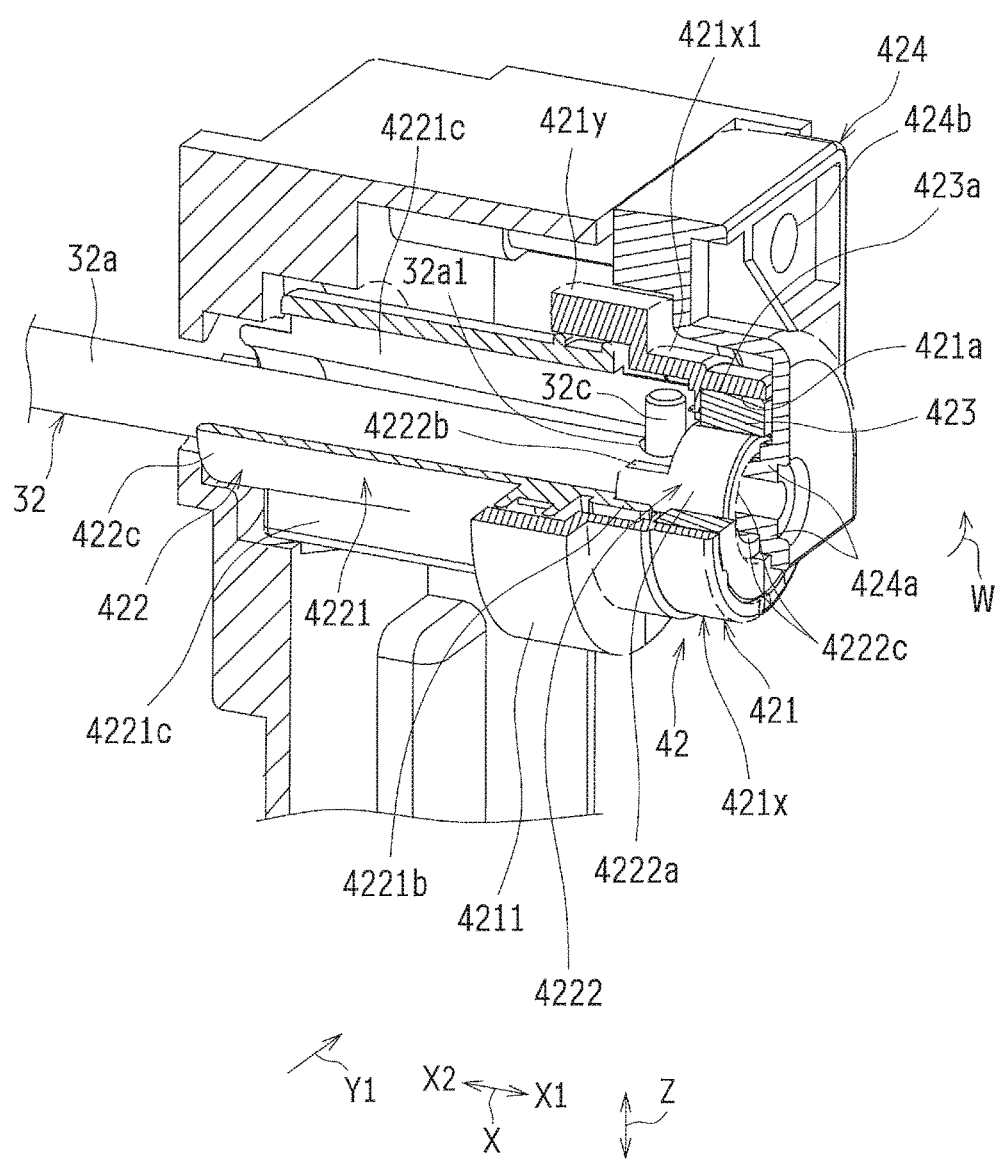
FIG. 15 is a partial schematic cross section of the drive transmission mechanism, as being cut away at a right angle, wherein a first one of the discharge rollers is shifted to an outermost position on the first side in the rotational axis directions.
Figure 16:
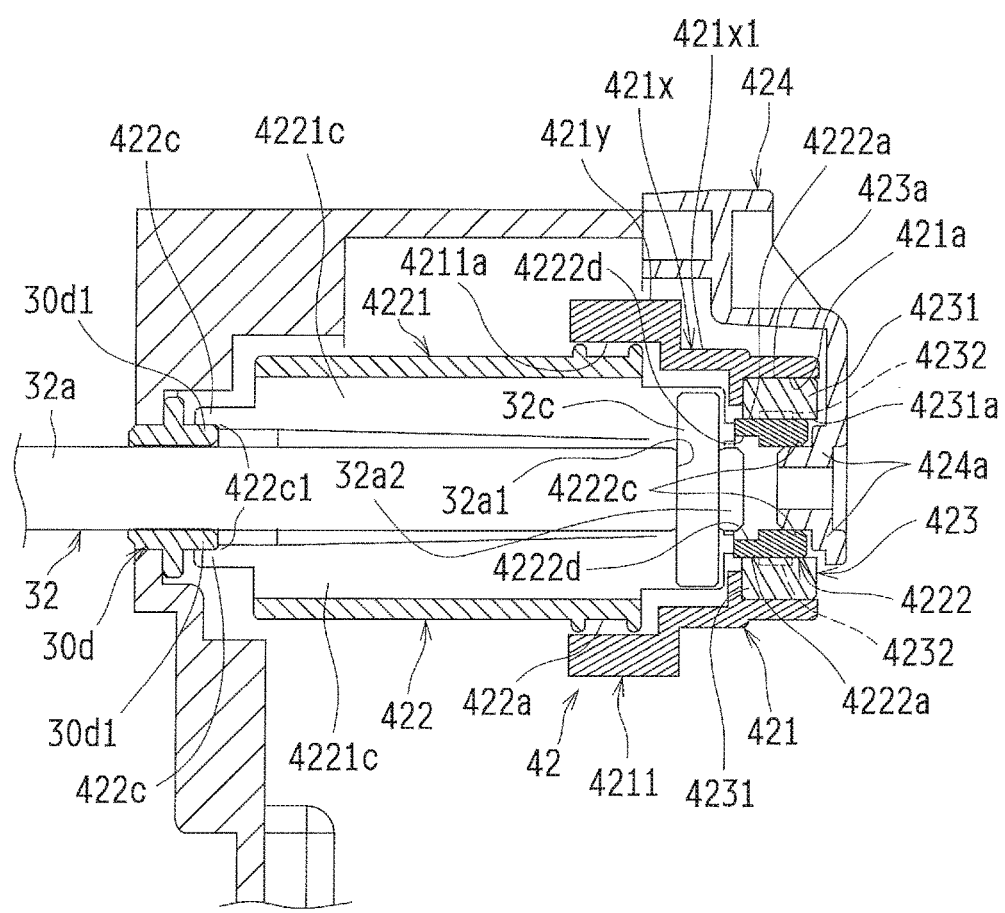
FIG. 16 is a partial schematic cross section of the drive transmission mechanism, taken along the line C-C in FIG. 8, wherein the first one of the discharge rollers is shifted to the outermost position on the first side in the rotational axis directions.
Figure 16:
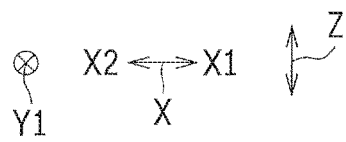
Figure 17:
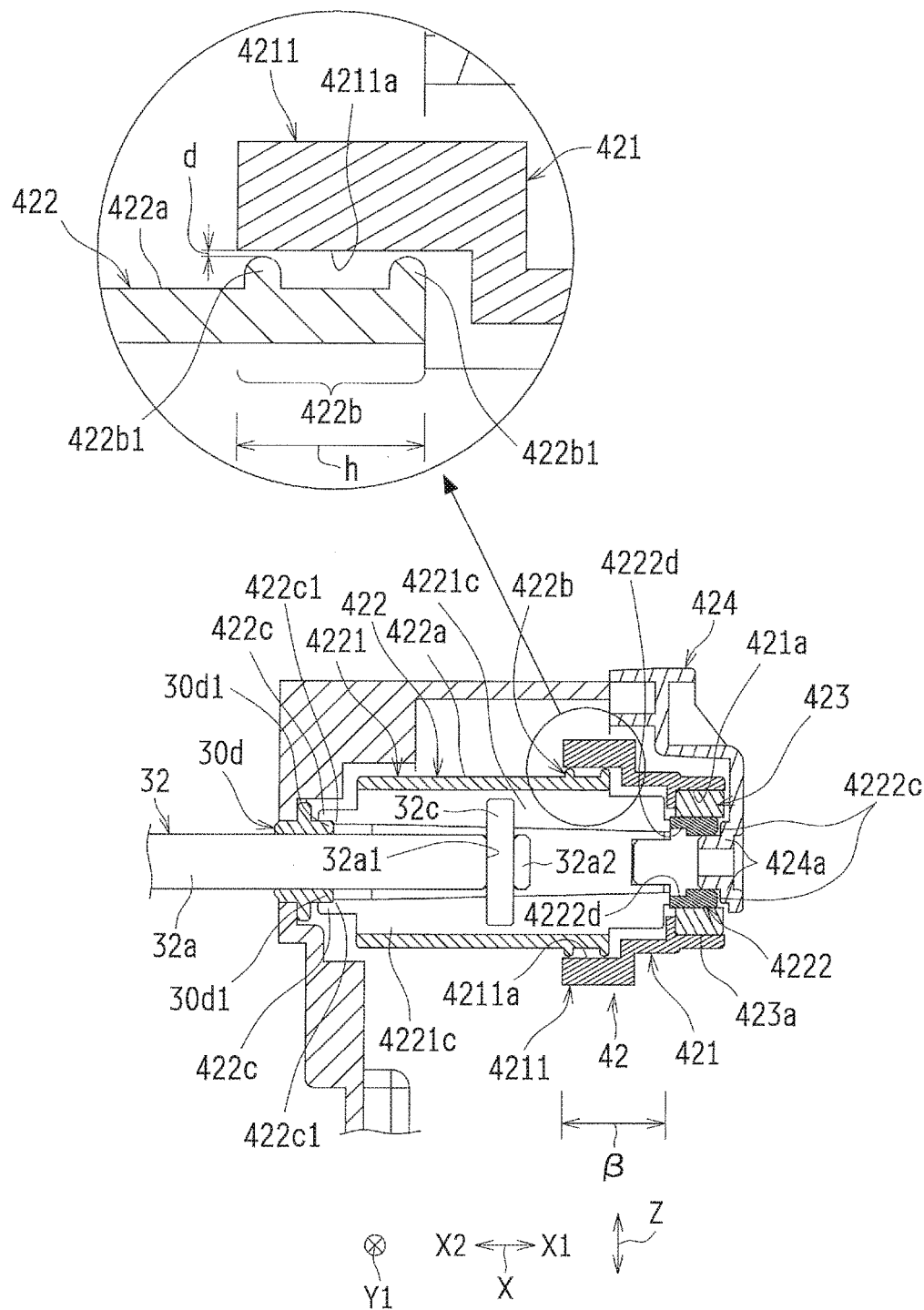
FIG. 17 is a partial schematic cross section of the drive transmission mechanism, taken along the line C-C in FIG. 8, for describing a clearance between a proximal portion of the holder and an inner peripheral surface of a receiving portion in a rotary drive transmission member, the proximal portion being provided at an outer peripheral surface of an outer end of the holder in the rotational axis directions.

FIG. 8 is a schematic side view of the sheet discharging device 400 shown in FIG. 5, as viewed from the first side X1 in the rotational axis directions X. FIG. 9 is a schematic cross section of the sheet discharging device 400 shown in FIG. 5, taken along a line C-C in FIG. 8. FIG. 10 is a partial schematic perspective view of the sheet discharging device 400 shown in FIG. 7, on the first side X1 in the rotational axis directions X. FIG. 11 is an enlarged partial schematic perspective view of the drive transmission mechanism 42 in the sheet discharging device 400 shown in FIG. 7. FIG. 12 is an exploded perspective view showing constituent members of the drive transmission mechanism 42 shown in FIGS. 10 and 11. FIG. 13 is a perspective view showing a holder main body 4221 and an axial member 4222 of a holder 422 in the drive transmission mechanism 42. FIG. 14 is a perspective view in which the axial member 4222 is engaged with the holder main body 4221. FIG. 15 is a partial schematic cross section of the drive transmission mechanism 42, as being cut away at a right angle, wherein the first discharge roller 32 is shifted to an outermost position on the first side X1 in the rotational axis directions X. FIG. 16 is a partial schematic cross section of the drive transmission mechanism 42, as being taken along the line C-C in FIG. 8, wherein the first discharge roller 32 is shifted to the outermost position on the first side X1 in the rotational axis directions X. FIG. 17 is a partial schematic cross section of the drive transmission mechanism 42, taken along the line C-C in FIG. 8, for describing a clearance between a proximal portion 422b of the holder 422 and an inner peripheral surface 4211a of a receiving portion 4211 in a rotary drive transmission member 421, the proximal portion 422b being provided at an outer peripheral surface 422a of an outer end of the holder 422 in the rotational axis directions X. Note that the biasing members 34 are omitted in FIG. 9.

—Configuration of the Drive Transmission Mechanism—

The drive transmission mechanism 42 serves to transmit a rotational driving force to the first discharge roller 32 (hereinafter simply called the discharge roller 32) which is caused to shift in the rotational axis directions X. The drive transmission mechanism 42 includes a rotary drive transmission member 421 (see FIGS. 4, 5, 7 to 12, and 15 to 17) which is driven to rotate in the predetermined rotational direction W (see FIGS. 2, 5, 7, 8, and 10 to 15) (in this example, the discharging direction Y1 of the sheet P), a holder 422 (see FIGS. 4, 7, and 9 to 17) which holds the discharge roller 32 in such a manner that the discharge roller 32 can slide freely in the rotational axis directions X while rotating about the rotational axis α, and a one-way clutch 423 (see FIGS. 4, 7, 9 to 12, and 15 to 17) interposed between the rotary drive transmission member 421 and the holder 422.

The rotary drive transmission member 421 may be, for example, a gear to be engaged with another gear, or a pulley over which a belt, a chain or the like is trained. In this example, the rotary drive transmission member 421 is a gear.

The one-way clutch 423 is configured to transmit a rotational driving force from the rotary drive transmission member 421 to the holder 422, and to permit the holder 422 to rotate in the predetermined rotational direction W relative to the rotary drive transmission member 421. Namely, the one-way clutch 423 is permitted to rotate in the discharging direction Y1, and the direction in which the rotation is prohibited (the direction in which the rotation is not performed) is opposite direction to the discharging direction Y1.

In the sheet discharging device 400, in order to shift the discharge roller 32 in the rotational axis directions X, the shift drive device 50 is driven to shift the discharge roller shift unit 30 in the rotational axis directions X by means of the shift mechanism 52. At this time, the roller axis 32a of the discharge roller 32 reciprocates in the holder 422 in the rotational axis directions X. Further, in order to rotate the discharge roller 32 about the rotational axis α in the predetermined rotational direction W, the rotary drive device 40 is driven to rotate the discharge roller 32 about the rotational axis α in the predetermined rotational direction W by means of the drive transmission mechanism 42 (the rotary drive transmission member 421, the one-way clutch 423, and the holder 422).

In the present embodiments, the holder 422 holds the discharge roller 32 in such a manner that the discharge roller 32 can slide freely in the rotational axis directions X while rotating about the rotational axis α. As a result, it is easily possible to realize a compact structure for rotating the discharge roller 32 about the rotational axis α and shifting the discharge roller 32 in the rotational axis directions X (see FIG. 10, etc.). Besides, the one-way clutch 423 is interposed between the transmission member 421 which is driven to rotate in the predetermined rotational direction W and the holder 422. Owing to this structure, it is possible to reduce a load in the rotational axis directions X to be imposed on the one-way clutch 423. It is further possible to employ a single, relatively short one-way clutch as the one-way clutch 423, irrespective of the length in the rotational axis directions X. Eventually, the drive transmission mechanism 42 having a simple and compact structure can be realized at a low cost. Further, the one-way clutch 423 transmits a rotational driving force from the rotary drive transmission member 421 to the holder 422, thereby driving the discharge roller 32 to rotate at a predetermined peripheral speed. In this example, a rotational driving force from the rotary drive transmission member 421 is transmitted via the one-way clutch 423 and the holder 422 to the discharge roller 32, and this discharge roller 32 can discharge a sheet P at a predetermined sheet discharge speed (specifically, an image formation speed, or a processing speed, at which an image formation process is carried out in the image forming apparatus main body 110). Furthermore, the one-way clutch 423 is configured to permit the holder 422 to rotate in the predetermined rotational direction W relative to the rotary drive transmission member 421. As a result, the discharge roller 32 which is driven to rotate in the predetermined rotational direction W can be forcibly rotated at a faster peripheral speed without affecting the rotation of the rotary drive transmission member 421. In this example, even if the sheet discharge speed gets faster (specifically, faster than a sheet transport speed at which the sheet P was fed in) during the discharge process of a sheet P (specifically, after a trailing edge P2 of the sheet P passes through the pre-discharging rollers 14), the sheet P can be discharged without fail.

As described above, the present embodiments can reduce a load in the rotational axis directions X to be imposed on the one-way clutch 423, can provide the drive transmission mechanism 42 having a simple and compact structure at a low cost, and can forcibly rotate the discharge roller 32, which is driven to rotate in the predetermined rotational direction W, at a faster peripheral speed. In this example, even if the sheet discharge speed gets faster (specifically, faster than a sheet transport speed at which the sheet P was fed in) during the discharge process of a sheet P, the sheet P can be discharged without fail. For example, in a case where a post-processing apparatus 500 (see FIG. 3) is attached to the image forming apparatus main body 110, and where the post-processing speed in the post-processing apparatus 500 is faster than the image formation speed in the image forming apparatus main body 110, the sheet discharge speed is made faster than the image formation speed during the discharge process of a sheet P (for example, the sheet discharge speed is made faster by a difference between the faster post-processing speed and the slower image formation speed) after the trailing edge P2 of the sheet P passes through the pre-discharging rollers 14 in the image forming apparatus main body 110, in order to match the image formation speed and the post-processing speed precisely or as precisely as possible. Even in this case, the sheet P can be discharged without fail.

First Embodiment

The holder 422 has a holder main body 4221 (see FIGS. 4, 7, and 9 to 17) and an axial member 4222 (see FIGS. 4, 7, and 9 to 17) attached to the holder main body 4221. The one-way clutch 423 is interposed between the rotary drive transmission member 421 and the axial member 4222, and is configured to transmit a rotational driving force from the rotary drive transmission member 421 to the holder main body 4221 via the axial member 4222.

Despite a simple arrangement with use of the axial member 4222, the holder 422 can transmit a rotational driving force from the rotary drive transmission member 421 to the holder main body 4221 via the axial member 4222.

Additionally, for further miniaturization of the drive transmission mechanism 42, the one-way clutch 423 is desirably composed of an outer ring to be attached to the rotary drive transmission member, and at least one rolling member rotatable in one direction and provided in an inner peripheral surface of the outer ring (a one-way clutch without an inner ring).

In this respect, the one-way clutch 423 is composed of an outer ring 4231 (see FIG. 16) to be attached to the rotary drive transmission member 421, and at least one rolling member 4232 (in this example, a plurality of rolling members 4232-4232) (for example, one or more rollers and/or balls) (see FIG. 16) rotatable in one direction and provided in an inner peripheral surface 4231a of the outer ring 4231 (see FIG. 16) (a one-way clutch without an inner ring). The one-way clutch without an inner ring, as employed herein, may be a conventionally known one and hence is not described in detail. The axial member 4222 is composed of a rigid member (specifically, a rigid member whose hardness is approximately equal to or greater than that of the rolling members 4232-4232). The axial member 4222 is configured to be inserted along the inner peripheral surface 4231a of the outer ring 4231, allowing an outer peripheral surface 4222a (see FIGS. 7, and 13 to 16) to make contact with the rolling member 4232, and the axial member 4222 is configured to rotate with the rolling member 4232 while maintaining the contact with the rolling member 4232.

Owing to this structure, a rotational driving force from the rotary drive transmission member 421 can be transmitted to the discharge roller 32 via the outer ring 4231 and the rolling member 4232 of the one-way clutch 423 and then via the axial member 4222 as the rigid member and the holder main body 4221. Besides, the rolling member 4232 can permit the holder 422 and the discharge roller 32 to rotate relatively in the predetermined rotational direction W relative to the rotary drive transmission member 421. The one-way clutch 423 without an inner ring, composed of the outer ring 4231 and the rolling member 4232, can make the drive transmission mechanism 42 more compact.

Specifically, the rotary drive transmission member 421 has a hollow structure, being open at both ends in the rotational axis directions X. The outer peripheral surface 423a (see FIGS. 15 to 17) of the one-way clutch 423 is fixed (in this example, press fit) on the inner peripheral surface 421a of the rotary drive transmission member 421 (see FIGS. 15 to 17).

Incidentally, the use of the one-way clutch 423 without an inner ring, composed of the outer ring 4231 and the rolling member 4232, may cause following inconvenience. In the case where the axial member 4222 is composed of a relatively soft member such as a resin or is plated at a contact portion with the rolling member 4232, the axial member 4222 is likely to wear out at the contact portion with the rolling member 4232 when the axial member 4222 transmits a rotational driving force from the rotary drive transmission member 421, via the outer ring 4231 and the rolling member 4232 of the one-way clutch 423, to the holder main body 4221 of the holder 422. In this undesirable situation, the axial member 4222 becomes bidirectionally rotatable relative to the rotary drive transmission member 421, and cannot provide the discharge roller 32 with a driving force for discharging a sheet P.

In this example, the axial member 4222 composed of a rigid member can effectively prevent the inconvenience that the axial member 4222 wears out at the contact portion with the rolling member 4232 and that the axial member 4222 cannot provide the discharge roller 32 with a driving force for discharging a sheet P.

The above-described configuration is properly applicable not only to the one-way clutch without an inner ring, but also to a one-way clutch equipped with an inner ring. Namely, in the one-way clutch equipped with an inner ring, the above-described configuration can also effectively prevent wearing of the axial member 4222 due to engagement backlash.

In this example, the axial member 4222 composed of a rigid member is made of a metallic material, which can easily provide the axial member 4222 as a rigid member.

The metallic material includes, for example, stainless steel, titanium alloy, carbon steel, and the like. Use of such a material can facilitate manufacture of the axial member 4222, and can easily realize the axial member 4222 composed of a rigid member at a relatively low cost. In this example, the axial member 4222 is made of stainless steel. In addition to the metallic material, the rigid member may also include, for example, carbon resins and ceramics.

—Attachment/Detachment Structure of the Axial Member—

The axial member 4222 can be freely attached to and detached from the holder main body 4221, which can improve assembly efficiency for the holder main body 4221 and the axial member 4222. The axial member 4222 may be fixed by press fitting or the like.

To be specific, the axial member 4222 is engaged with the holder main body 4221, in such a manner as to be freely insertable into and removable from the holder main body 4221 in the rotational axis directions X and to be incapable of rotating about the rotational axis α relative to the holder main body 4221 (to be fixed in the predetermined rotational direction W and in the direction opposite to the rotational direction W).

According to this arrangement, it is possible to transmit a rotational driving force from the rotary drive transmission member 421 to the holder main body 4221 via the axial member 4222, by simply engaging the axial member 4222 with the holder main body 4221.

In this example, the holder main body 4221 and the axial member 4222 have rotation check portions 4221b, 4222b (see FIGS. 7, and 12 to 15), respectively, which are engaged with each other to allow co-rotation of the holder main body 4221 and the axial member 4222.

According to this arrangement, the holder main body 4221 and the axial member 4222 can be securely engaged with each other such that the axial member 4222 does not rotate about the rotational axis α relative to the holder main body 4221.

The rotation check portion 4221b of the holder main body 4221 is provided at an outer end (in this example, an end on the first side X1) of the holder main body 4221 in the rotational axis directions X. The rotation check portion 4222b of the axial member 4222 is provided at an inner end (in this example, an end on the second side X2) of the axial member 4222 in the rotational axis directions X.

This arrangement can make the drive transmission mechanism 42 more compact in the rotational axis directions X.

Specifically, the holder main body 4221 and the axial member 4222 are engaged with each other at a concave portion and a convex portion. The rotation check portion 4221b of the holder main body 4221 may be the concave portion (specifically, the dent), and the rotation check portion 4222b of the axial member 4222 may be the convex portion (specifically, the protrusion). Alternatively, the rotation check portion 4221b of the holder main body 4221 may be the convex portion (specifically, the protrusion), and the rotation check portion 4222b of the axial member 4222 may be the concave portion (specifically, the dent).

The holder main body 4221 may have, for example, a hollow cylindrical shape with one end closed (a closed-bottom hollow cylindrical shape) or a hollow cylindrical shape with both ends open (a through hollow cylindrical shape). The axial member 4222 may have, for example, a solid columnar shape, a hollow cylindrical shape with one end closed (a closed-bottom hollow cylindrical shape), or a hollow cylindrical shape with both ends open (a through hollow cylindrical shape).

If the axial member 4222 has a solid columnar shape or a closed-bottom hollow cylindrical shape, the rotation check portion 4222b of the axial member 4222 may be a non-circular concave portion or convex portion (for example, a D-shaped concave portion or convex portion, i.e. so-called D-cut, or a polygonal, oval or bale-shaped concave portion or convex portion) as viewed in the rotational axis directions X, and the rotation check portion 4221b of the holder main body 4221 may be a non-circular concave portion or convex portion corresponding to the shape of the rotation check portion 4222b of the axial member 4222 as viewed in the rotational axis directions X.

If the axial member 4222 has a through hollow cylindrical shape, an end of the rotation check portion 4222b of the axial member 4222 in the rotational axis direction may be formed into one or more protrusions which project(s) in the rotational axis direction at one or more positions along a circumference of this end (for example, which project(s) circumferentially evenly), or may be formed into one or more dents which is/are indented in the rotational axis direction at one or more positions along the circumference (for example, which is/are indented circumferentially evenly). In addition, an end of the rotation check portion 4221b of the holder main body 4221 in the rotational axis direction may be formed into one or more dents which is/are indented in the rotational axis direction along a circumference of this end (for example, which is/are indented circumferentially evenly), or may be formed into one or more protrusions which project(s) in the rotational axis direction at one or more positions along the circumference (for example, which project(s) circumferentially evenly).

In this example, the holder main body 4221 has a through hollow cylindrical shape, and the axial member 4222 also has a through hollow cylindrical shape. At an end on the second side X2 in the rotational axis directions X, the rotation check portions 4222b of the axial member 4222 are provided circumferentially evenly (aligned diametrically) at two positions along the circumference of this end, in the form of protrusions which project in one of the rotational axis directions X. At an end on the first side X1 in the rotational axis directions X, the rotation check portions 4221b of the holder main body 4221 are provided circumferentially evenly (aligned diametrically) at two positions along the circumstance of this end, in the form of dents which are indented in one of the rotational axis directions X (specifically, bale-shaped engagement holes as viewed in the rotational axis directions X).

—Receiving Member—

The drive transmission mechanism 42 is further equipped with a receiving member 424 (see FIGS. 5 to 12, and 15 to 17) (specifically, a cover member) which supports the axial member 4222 such that the axial member 4222 can freely rotate about the rotational axis α together with the rotary drive transmission member 421 via the one-way clutch 423.

According to this arrangement, the axial member 4222 which rotates about the rotational axis α can be held more securely by the receiving member 424.

To be more specific, the receiving member 424 has a limiter portion 424a (see FIGS. 5, 7 to 12, and 15 to 17) which limits movement of the axial member 4222 to the first side X1 in the rotational axis directions X. The axial member 4222 has an engagement portion 4222c to be engaged with the limiter portion 424a of the receiving member 424 (see FIGS. 7, and 9 to 17).

In this arrangement, the engagement portion 4222c of the axial member 4222 permits a relative rotation of the axial member 4222 about the rotational axis α, and the limiter portion 424a of the receiving member 424 can effectively prevent the axial member 4222 from moving to the first side X1 in the rotational axis directions X (specifically, prevent the axial member 4222 from coming off).

Specifically, the receiving member 424 is detachably fixed on the main body frame 30a of the discharge roller shift unit 30.

In this example, the receiving member 424 is fastened on the main body frame 30a by one or more fastening members SC (in this example, two external threads) (see FIG. 5). In order to set the fastening members SC, SC, one or more fastening portions 30a1 (in this example, two internal thread holes) (see FIGS. 5 and 7) and one or more positioning portions 30a2 (in this example, one positioning protrusion) (see FIGS. 5 and 8) are provided in one side surface of the main body frame 30a in the rotational axis directions X on which the drive transmission mechanism 42 is mounted. In the receiving member 424, through holes 424b-424b (see FIGS. 5, 7, 8, 10 to 12, and 15) are formed at the positions corresponding to the fastening portions 30a1, 30a1 of the main body frame 30a and the positioning portions 30a2. By the fastening members SC, SC, the receiving member 424 can be fastened on the main body frame 30a more securely.

—Rotation Check Member for the Discharge Roller—

The discharge roller 32 is equipped with a rotation check member 32c which engages with the holder 422 and which causes the holder 422 to co-rotate (see FIGS. 4, 7, 9 to 12, and 15 to 17). The rotation check member 32c is provided at an end of the roller axis 32a of the discharge roller 32 in the rotational axis directions X (an end on which the holder 422 is mounted). To be more specific, the rotation check member 32c is provided in the vicinity of inward from an end face of the roller axis 32a on the first side X1 in the rotational axis directions X (inward from the end face by a certain distance sufficient to provide the rotation check member 32c). The rotation check member 32c is configured to be in proximity to the axial member 4222 (specifically, to be in the vicinity of, but not in contact with, the axial member 4222) when the discharge roller 32 shifts to the outermost position.

This arrangement can make the drive transmission mechanism 42 more compact in the rotational axis directions X.

Specifically, the rotation check member 32c is a pin having a smaller diameter than the roller axis 32a. The rotation check member 32c is longer than the diameter of the roller axis 32a and is long enough to be inserted through the holder main body 4221. The roller axis 32a has a through hole 32a1 through which the rotation check member 32c is inserted (see FIGS. 10 to 12, and 15 to 17). The rotation check member 32c is fixed (in this example, press fit) in the through hole 32a1 in the roller axis 32a. The rotation check member 32c protrudes from the roller axis 32a, evenly in diametrical directions of the roller axis 32a.

—Axial Member Receiving Portion—

Specifically, the axial member 4222 has a receiving portion 4222d (see FIGS. 12 to 14, 16, and 17) at its inner end (in this example, an end on the second side X2) in the rotational axis directions X. The receiving portion 4222d is configured to receive an outer end 32a2 of the roller axis 32a of the discharge roller 32 in the rotational axis directions X (see FIGS. 16 and 17) when the discharge roller 32 shifts to the outermost position.

This arrangement can make the drive transmission mechanism 42 more compact in the rotational axis directions X.

In the axial member 4222 of this example, the inner diameter at the inner end (in this example, the end on the second side X2) in the rotational axis directions X is reduced gradually (in this example, in two steps) toward the outer side in the rotational axis directions X.

—Holder Locking Guide Unit—

The holder 422 (specifically, the holder main body 4221) is also equipped with a locking guide unit 4221c (see FIGS. 7, and 9 to 17). The locking guide unit 4221c locks the rotation check member 32c of the roller axis 32a of the discharge roller 32 in the rotational direction W of the discharge roller 32, and guides the rotation check member 32c in the rotational axis directions X.

With this arrangement, the holder 422 can hold the discharge roller 32 securely in such a manner that the discharge roller 32 can slide freely in the rotational axis directions X while rotating smoothly about the rotational axis α.

Specifically, the holder main body 4221 is composed of a cylindrical member 422x (see FIGS. 13 and 14) and a box-like body 422y (in this example, a hollow cuboid body) (see FIGS. 13 and 14) which appear to be coaxially joined with each other. The size of the box-like body 422y in the rotational axis directions X is smaller than that of the cylindrical member 422x in the rotational axis directions X. The size of the box-like body 422y in one of its diametrical directions is greater than a diametrical external size of the cylindrical member 422x, and the size of the box-like body 422y in the other diametrical direction is smaller than the diametrical external size of the cylindrical member 422x. Portions of the box-like body 422y projecting from the cylindrical member 422x constitute the locking guide unit 4221c. In the holder 422 (specifically, the holder main body 4221), the locking guide unit 4221c intersects with the rotation check portion 4221b which engages with the rotation check portion 4222b of the axial member 4222 (in this example, intersecting at a right angle or substantially at a right angle).

—Openings in the Locking Guide Unit—

The locking guide unit 4221c is provided with openings 4221d (see FIGS. 13 and 14) which open in the diametrical directions of the discharge roller 32, at the outer end in the rotational axis directions X (in this example, the end on the first side X1 in the rotational axis directions X).

This arrangement can make the locking guide unit 4221c more compact in the diametrical directions, at the outer end of the locking guide unit 4221c in the rotational axis directions X.

—Materials for the Rotary Drive Transmission Member and the Holder—

The rotary drive transmission member 421 and the holder 422 are made of different materials from each other. With this arrangement, the rotary drive transmission member 421 and the holder 422 can meet their required functions.

Material for the Rotary Drive Transmission Member

For example, the rotary drive transmission member 421, which functionally requires a strength, is made of a high-strength material. Use of such a material can enhance the strength of the rotary drive transmission member 421. Materials for the rotary drive transmission member 421 may be, for example, polyacetal (POM: PolyOxyMethylene), polyamide (PA: PolyAmide), polyphenylene sulfide (PPS: PolyPhenylene Sulfide), etc. From the viewpoint of reducing noise which results from frictional resistance due to a contact with the associated drive transmission member (in this example, the drive gear 41b), the rotary drive transmission member 421 may be made of a sliding grade material. Use of such a material can reduce a frictional resistance due to a contact of the rotary drive transmission member 421 and the associated drive transmission member (in this example, the drive gear 41b), and can thereby contribute to noise reduction. Typical examples of the sliding grade materials include resin materials containing lubricants with excellent slidability (for example, polyacetals containing lubricants such as fluorine compounds, oil impregnation polyethylene, etc., so-called polyacetal sliding grade materials).

Material for the Holder

The holder 422, which functionally requires a slipping property, is made of a material having a slipping property. Use of such a material can enhance the slipping property of the holder 422. Materials for the holder 422 may be, for example, polyacetals (POM: PolyOxyMethylene), polyamide (PA: PolyAmide), polytetrafluoroethylene (PTFE: PolyTetraFluoroEthylene), etc.

—Engagement Portion in the Rotary Drive Transmission Member—

In this example, the rotary drive transmission member 421 has a basal portion 421x (see FIGS. 12, 15, and 16), and an engagement portion 421y (see FIGS. 12, 15, and 16) (in this example, gear teeth) formed at the entire outer peripheral part of the basal portion 421x so as to engage with the associated rotary drive transmission member (in this example, the drive gear 41b). The basal portion 421x and the engagement portion 421y are formed as a single piece.

The engagement portion 421y may be provided at any position at the outer peripheral surface of the basal portion 421x in the rotational axis directions X. In this example, the engagement portion 421y is formed at an inner end (in this example, an end on the second side X2) of the outer peripheral surface of the basal portion 421x in the rotational axis directions X. On an outer side (in this example, on the first side X1) in the rotational axis directions X relative to the engagement portion 421y, the basal portion 421x has a seat 421x1 (see FIGS. 12, 15, and 16) which makes contact with the limiter member 41b1 of the drive gear 41b and which sets a gear distance between the rotary drive transmission member 421 and the drive gear 41b. In this example, the seat 421x1 is adjacent to the engagement portion 421y. The basal portion 421x, the engagement portion 421y, and the seat 421x1 are formed as a single piece.

—Location of the One-Way Clutch—

The one-way clutch 423 may be provided at any position at the rotary drive transmission member 421 in the rotational axis directions X. In this example, the one-way clutch 423 is fixed at an outer end (in this example, an end on the first side X1) of the rotary drive transmission member 421 in the rotational axis directions X.

This arrangement can provide a wide space on the inner side (in this example, the second side X2) of the rotary drive transmission member 421 in the rotational axis directions X. It is possible to make this space a moving space of the roller axis 32a of the discharge roller 32 in the rotational axis directions X, so that compactification of the drive transmission mechanism 42 in the rotational axis directions X can be achieved.

Specifically, the one-way clutch 423 is provided at an outer end (in this example, an end on the first side X1) on the inner peripheral surface of the basal portion 421x in the rotational axis directions X.

—Receiving Portion of the Rotary Drive Transmission Member—

The rotary drive transmission member 421 has a receiving portion 4211 (see FIGS. 5, 7 to 12, 15, and 16) which receives an outer end (in this example, an end on the first side X1) of the holder 422 in the rotational axis directions X. The receiving portion 4211 is provided at an inner end (in this example, an end on the second side X2) of the rotary drive transmission member 421 in the rotational axis directions X.

This arrangement can ensure insertion of the outer end (in this example, the end on the first side X1) of the holder 422 in the rotational axis directions X into the rotary drive transmission member 421.

To be specific, the openings 4221d in the holder 422 include a portion at which the locking guide unit 4221c is inserted in the receiving portion 4211 of the rotary drive transmission member 421. In the rotary drive transmission member 421, the engagement portion 421y is provided along the outer peripheral surface of the receiving portion 4211.

—Proximal Portion in the Holder—

In the case where the outer end (in this example, the end on the first side X1) at the outer peripheral surface 422a (see FIGS. 16 and 17) of the holder 422 in the rotational axis directions X makes contact with the inner peripheral surface 4211a (see FIGS. 16 and 17) of the receiving portion 4211 of the rotary drive transmission member 421, the sliding contact of the holder 422 and the rotary drive transmission member 421 tends to cause abnormal noise (sliding contact noise) while the holder 422 rotates about the rotational axis α relative to the rotary drive transmission member 421. On the other hand, in the case where the outer end (in this example, the end on the first side X1) at the outer peripheral surface 422a of the holder 422 in the rotational axis directions X is separated too much from the inner peripheral surface 4211a of the receiving portion 4211 of the rotary drive transmission member 421, the holder 422 tends to tilt excessively to the rotational axis α due to a load change (namely, the holder 422 tends to oscillate greatly). Hence, when the holder 422 rotates about the rotational axis α relative to the rotary drive transmission member 421, the relative rotation may cause abnormal noise (for example, trill of the holder 422) due to the tilt of the holder 422 to the rotational axis α (due to the oscillations of the holder 422).

In this regard, the proximal portion 422b (see FIGS. 13, 14, and 17) is provided at the outer end (in this example, the end on the first side X1) along the outer peripheral surface 422a of the holder 422 (in this example, the holder main body 4221) in the rotational axis directions X. The proximal portion 422b is located in proximity to the inner peripheral surface 4211a of the receiving portion 4211 of the rotary drive transmission member 421.

While the holder 422 rotates about the rotational axis α relative to the rotary drive transmission member 421, even if the holder 422 comes into sliding contact with the rotary drive transmission member 421, this arrangement can effectively prevent abnormal noise caused by the sliding contact of the holder 422 and the rotary drive transmission member 421. Besides, the sliding contact of the receiving portion 4211 of the rotary drive transmission member 421 and the proximal portion 422b of the holder 422 can reduce a tilt of the holder 422 to the rotational axis α due to a load change (namely, can reduce oscillations of the holder 422). Thus, when the holder 422 rotates about the rotational axis α relative to the rotary drive transmission member 421, it is possible to prevent abnormal noise (for example, trill of the holder 422) due to the tilt of the holder 422 to the rotational axis α (due to the oscillations of the holder 422). Incidentally, the noise caused by the sliding contact of the proximal portion 422b of the holder 422 and the receiving portion 4211 of the rotary drive transmission member 421 when the holder 422 is tilted to the rotational axis α due to a load change is quieter and/or less frequent than, for example, abnormal noise (sliding contact noise) generated during continuous sliding contact of the holder 422 and the rotary drive transmission member 421.

To be specific, the proximal portion 422b has end portions 422b1, 422b1 (in this example, protrusions as shown in FIGS. 13 and 14, and the enlarged view in FIG. 17), at both ends of an opposed region β in the rotational axis directions X (see the entire view in FIG. 17) where the holder 422 is opposed to the receiving portion 4211 of the rotary drive transmission member 421. In at least a part of (in this example, a part of) the opposed region β, the proximal portion 422b are closest, at least at the end portions 422b1, 422b1, to the receiving portion 4211. Specifically, the proximal portion 422b is located close to the receiving portion 4211, with a predetermined clearance d (see the enlarged view in FIG. 17) from the receiving portion 4211 so as not to be in contact with the receiving portion 4211. For example, the clearance d between the proximal portion 422b of the holder 422 and the inner peripheral surface 4211a of the receiving portion 4211 of the rotary drive transmission member 421 may be about 0.3 mm or less.

In this example, the proximal portion 422b is provided at the outer peripheral surface 422a of the holder 422. In addition, or instead, the proximal portion 422b may be provided on the inner peripheral surface 4211a of the receiving portion 4211 of the rotary drive transmission member 421.

A region of the receiving portion 4211 and a region of the proximal portion 422b which correspond to each other have a predetermined width h (see the enlarged view in FIG. 17) in the rotational axis directions X.

This arrangement can limit an amount of tilt of the holder 422 to the rotational axis α (an amount of oscillations of the holder 422), and can thereby further reduce abnormal noise due to the tilt of the holder 422 to the rotational axis α (due to the oscillations of the holder 422).

—Rib Structure in the Proximal Portion—

The end portions 422b1, 422b1 of the proximal portion 422b are composed of ribs.

Even if the holder 422 comes into sliding contact with the rotary drive transmission member 421, the ribs can decrease a sliding contact area between the holder 422 and the rotary drive transmission member 421, and can thereby reduce abnormal noise caused by the sliding contact of the holder 422 and the rotary drive transmission member 421.

To be specific, the end portions 422b1, 422b1 composed of ribs have a disc-like shape centered on or substantially centered on the rotational axis α. The end portions 422b1, 422b1 composed of disc-shaped ribs are coaxially provided on the holder main body 4221, with a predetermined gap between each other in the rotational axis directions X.

Tips of these end portions 422b1, 422b1 which face the rotary drive transmission member 421 may be formed to be in line contact with the rotary drive transmission member 421. For example, tips of the end portions 422b1, 422b1 may be curved (specifically, in an arc-like shape or elliptic arc-like shape in cross section) or may be pointed (specifically, in a polygonal shape such as a triangle in cross section).

Even if the holder 422 comes into sliding contact with the rotary drive transmission member 421, this arrangement can decrease the sliding contact area of the holder 422 and the rotary drive transmission member 421 as much as possible, and can thereby reduce abnormal noise caused by the sliding contact of the holder 422 and the rotary drive transmission member 421.

—Shape of the Axial Member—

The through hollow cylindrical shape of the axial member 4222, as adopted in the present embodiments, is an optimum shape for miniaturization of the drive transmission mechanism 42 in the rotational axis directions X. This arrangement can be easily achieved by providing a concave portion (specifically, a dent) by a through hole portion 4222e (see FIGS. 13 and 14) in the engagement portion 4222c on the outer side (in this example, the first side) of the axial member 4222 in the rotational axis directions X and by providing a convex portion (specifically, a protrusion) by the limiter portion 424a of the receiving member 424.

The closed-bottom hollow cylindrical shape of the axial member 4222 is also an optimum shape for miniaturization of the drive transmission mechanism 42 in the rotational axis directions X. This arrangement can be easily achieved by providing a dent or a protrusion by the engagement portion 4222c on the outer side (in this example, the first side) in the rotational axis directions of the axial member 4222, and by providing a convex portion (specifically, a protrusion) or a concave portion (specifically, a dent) by a limiter portion of a receiving member.

—Shape of the Holder—

The outer diameter at the outer end (in this example, the end on the first side X1) of the holder 422 is reduced gradually (in this example, in three steps) toward the outer side in the rotational axis directions X.

This arrangement can facilitate insertion of the holder 422 into the rotary drive transmission member 421.

—Shape of the Rotary Drive Transmission Member—

The outer diameter of the rotary drive transmission member 421 is reduced gradually (in this example, in three steps) toward the outer side (in this example, the first side X1) in the rotational axis directions X. The inner diameter of the rotary drive transmission member 421 is reduced gradually (in this example, in three steps) toward the outer side (in this example, the first side X1) in the rotational axis directions X.

This arrangement can provide a space on the diametrically outer side, at the outer end (in this example, the end on the first side) of the rotary drive transmission member 421 in the rotational axis directions X.

—Bearings—

The discharge roller shift unit 30 is equipped with bearings 30d which rotatably support the discharge roller 32 (see FIGS. 4 to 7, 9 to 12, 16, and 17).

These bearings 30d can allow the discharge roller 32 to rotate about the rotational axis α in a stable manner.

In this example, the discharge roller 32 is mounted in the main body frame 30a of the discharge roller shift unit 30, via a plurality of (in this example, three) bearings 30d-30d.

—Rotatable Support of the Holder—

An inner end 422c (in this example, an end on the second side X2) of the holder 422 in the rotational axis directions X (see FIGS. 7, 10 to 16, and the entire view in FIG. 17) is held by one of the bearings 30d in a rotatable manner about the rotational axis α.

In this arrangement, the bearing 30d can also serve as a support member for holding the inner end 422c (in this example, the end on the second side X2) of the holder 422 in the rotational axis directions X in a rotatable manner about the rotational axis α. Therefore, this arrangement does not require a separate support member, and can make the drive transmission mechanism 42 more compact.

In this example, one of the bearings 30d (the bearing 30d provided at the end on the first side X1 in the rotational axis directions X) is provided with a tubular engagement portion 30d1 (see FIGS. 7, 10 to 12, 16, and 17) which protrudes in the rotational axis directions X. The engagement portion 30d1 of the bearing 30d is inserted in the holder 422, with an outer peripheral surface of the engagement portion 30d1 being face to face with an inner peripheral surface at the inner end 422c (in this example, the end on the second side X2) of the holder 422 in the rotational axis directions X. The inner end 422c (in this example, the end on the second side X2) of the holder 422 in the rotational axis directions X is provided with a limiter portion 422c1 (see FIGS. 12 and 16, and the entire view in FIG. 17) (in this example, a dent) which limits the movement of the holder 422 to the second side X2 in the rotational axis directions X. With this arrangement, the movement of the holder 422 to the second side X2 in the rotational axis directions X can be limited by the limiter portion 422c1. The holder 422 is held so as to freely rotate about the rotational axis α by the bearing 30d and the receiving member 424.

This arrangement not only allows the holder 422 to rotate about the rotational axis α in a stable manner, but can also reduce the amount of tilt of the holder 422 to the rotational axis α (the amount of oscillations of the holder 422).

To be specific, the inner end 422c of the holder main body 4221 in the rotational axis directions X is held so as to freely rotate about the rotational axis α by the engagement portion 30d1 of the bearing 30d, and the engagement portion 4222c of the axial member 4222 engaged with the holder main body 4221 is held so as to freely rotate about the rotational axis α by the limiter portion 424a of the receiving member 424. As a result, the holder 422 can rotate about the rotational axis α, with its movement to the second side X2 in the rotational axis directions X being limited by the limiter portion 422c1, and its movement to the first side X1 in the rotational axis directions X being limited by the limiter portion 424a of the receiving member 424.

Second Embodiment

In the case where the rotary drive transmission member 421 is a gear, spur gear teeth is applicable, but considerable noise is likely between the spur gear teeth of the rotary drive transmission member 421 and the spur gear teeth of a mating gear (in this example, the drive gear 41b). Hence, it is desirable for the gear for the rotary drive transmission member 421 to have helical gear teeth, which are less likely to make loud noise with the gear teeth of the mating gear. In this context, the helical gear teeth refer to teeth formed obliquely to the rotational axis α.

According to this embodiment, the rotary drive transmission member 421 is a gear having helical gear teeth. In a conventional configuration (as disclosed in JP H08-091677 A), the rotary drive transmission member, which makes a shift movement, cannot adopt a helical gear. In contrast, the rotary drive transmission member 421 in the present embodiment can adopt a helical gear because the drive transmission mechanism 42 does not require shift movement of the rotary drive transmission member 421. As a result, the noise made by the helical teeth of the rotary drive transmission member 421 and the helical teeth of the mating gear (in this example, the drive gear 41b) is quieter in comparison with the noise made in the conventional configuration.

Third Embodiment

The image forming apparatus 100 is further equipped with a post-processing apparatus 500 (see FIG. 3) which carries out a predetermined post-processing.

The post-processing apparatus 500 is electrically connected to the control section 200. In the post-processing apparatus 500, the post-processing speed is faster than the image formation speed (the processing speed) in the image forming apparatus main body 110. Accordingly, the post-processing apparatus 500 is configured to transport a sheet P discharged from the sheet discharging device 400 at a faster speed than the image formation speed.

To be specific, in a state where the control section 200 receives a no-sheet passing signal which is detected by the second detection unit SN2 and which indicates that no sheet P is passing between the nearest rollers (in this example, the pre-discharging rollers 14) while the control section 200 is receiving a sheet passing signal which is detected by the first detection unit SN1 and which indicates that a sheet P is passing between the pair of discharge rollers 32, 33, the post-processing apparatus 500 is driven to transport a sheet P discharged from the sheet discharging device 400 at a faster speed than the image formation speed. When or after the post-processing apparatus 500 is driven to transport the sheet P, the control section 200 stops rotary drive of the discharge roller 32 by the rotary drive device 40 in the image forming apparatus main body 110.

As described above, even when a sheet P discharged from the sheet discharging device 400 is transported by the post-processing apparatus 500 at a faster speed than the image formation speed, the one-way clutch 423 transmits a rotational driving force from the rotary drive transmission member 421 to the holder 422, and permits rotation of the holder 422 in the predetermined rotational direction W relative to the rotary drive transmission member 421. Accordingly, the discharge roller 32 which is driven to rotate in the predetermined rotational direction W can be rotated forcibly at a faster peripheral speed, so that a sheet P can be discharged from the sheet discharging device 400 without fail. Eventually, the post-processing apparatus 500 can gain time by transporting a sheet P at a faster speed than the image formation speed, and can thereby match the image formation speed and the post-processing speed precisely or as precisely as possible and keep the image formation speed and the post-processing speed coordinated with each other.

Other Embodiments

Regarding the pair of discharge rollers 32, 33, the first discharge roller 32 is driven in the above embodiments. Alternatively, at least either of the pair of discharge rollers 32 or 33 may be driven and equipped with the rotary drive device 40 (the drive transmission mechanism 42). Additionally, on the driven one of the pair of discharge rollers 32, 33, the rotary drive device(s) 40 (the drive transmission mechanism(s) 42) may be provided on either or both of the first side X1 and the second side X2 of the driven discharge roller.

In the above embodiments, the drive transmission mechanism 42 is configured to apply to the discharge roller 32 which discharges a sheet P to the outside (in this example, the discharge tray 15). Alternatively, the drive transmission mechanism 42 may be applied to transport rollers which transport a sheet P to a next step inside the image forming apparatus 100, in which case the drive transmission mechanism 42 may be provided in a sheet transport device for transporting a sheet.

The present invention should not be limited to the above-described embodiments, and can be embodied and practiced in other different forms. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. A drive transmission mechanism which transmits a rotational driving force to a roller to be shifted in directions of a rotational axis thereof, the drive transmission mechanism comprising:
   a rotary drive transmission member which is driven to rotate in a predetermined rotational direction;
   a holder which holds the roller in such a manner that the roller can slide freely in the rotational axis directions while rotating about the rotational axis; and
   a one-way clutch interposed between the rotary drive transmission member and the holder, wherein
   the one-way clutch transmits a rotational driving force from the rotary drive transmission member to the holder, and permits the holder to rotate in the predetermined rotational direction relative to the rotary drive transmission member,
   the holder includes a holder main body, and an axial member provided in the holder main body,
   the one-way clutch is interposed between the rotor drive transmission member and the axial member, and transmits the rotational driving force from the rotary drive transmission member to the holder main body via the axial member, and
   the axial member is attachable to and detachable from the holder main body.

2. The drive transmission mechanism according to claim 1,
   wherein the holder main body and the axial member are engaged with each other at a concave portion and a convex portion.
3. The drive transmission mechanism according to claim 2,
   wherein the one-way clutch includes an outer ring attachable to the rotary drive transmission member, and a rolling member which is provided in an inner peripheral surface of the outer ring and rotatable in one direction,
   the axial member is defined by a rigid member, and
   the axial member is configured to be inserted along the inner peripheral surface of the outer ring, to allow an outer peripheral surface of the axial member to make contact with the rolling member, and to rotate with the rolling member.
4. The drive transmission mechanism according to claim 3,
   wherein the axial member defined by the rigid member is made of a metallic material.
5. The drive transmission mechanism according to claim 1,
   wherein the one-way clutch is fixed at an outer end of the rotary drive transmission member in the rotational axis directions, and
   a receiving portion that receives an end of the holder is provided at an inner end of the rotary drive transmission member.
6. The drive transmission mechanism according to claim 1,
   wherein the rotary drive transmission member is a gear, and
   wherein the gear has helical teeth.
7. A sheet discharging device comprising the drive transmission mechanism according to claim 1,
   wherein the roller is a discharge roller that discharges a sheet, and
   when the sheet is discharged by the discharge roller, the discharge roller is shifted in rotational axis directions thereof.
8. An image forming apparatus comprising the sheet discharging device according to claim 7.
9. A drive transmission mechanism which transmits a rotational driving force to a roller to be shifted in directions of a rotational axis thereof, the drive transmission mechanism comprising:
   a rotary drive transmission member which is driven to rotate in a predetermined rotational direction;
   a holder which holds the roller such that the roller can slide freely in the rotational axis directions while rotating about the rotational axis; and
   a one-way clutch interposed between the rotary drive transmission member and the holder, wherein
   the one-way clutch transmits a rotational driving force from the rotary drive transmission member to the holder, and permits the holder to rotate in the predetermined rotational direction relative to the rotary drive transmission member,
   the one-way clutch is fixed at an outer end of the rotary drive transmission member in the directions of the rotational axis, and
   a receiving portion that receives an end of the holder is provided at an inner end of the rotary drive transmission member.
10. A sheet discharging device comprising the drive transmission mechanism according to claim 9,
    wherein the roller is a discharge roller that discharges a sheet, and
    when the sheet is discharged by the discharge roller, the discharge roller is shifted in rotational axis directions thereof.
11. An image forming apparatus comprising the sheet discharging device according to claim 10.

* * * * *